(12) United States Patent
Zhang et al.

(10) Patent No.: US 11,027,840 B2
(45) Date of Patent: Jun. 8, 2021

(54) AUTONOMOUS SELF-STABILIZING AERIAL SYSTEM AND METHOD

(71) Applicant: Hangzhou Zero Zero Technology Co., Ltd., Zhejiang (CN)

(72) Inventors: Lei Zhang, Zhejiang (CN); Zhaozhe Wang, Zhejiang (CN); Chenhui Qian, Zhejiang (CN); Xiang Li, Zhejiang (CN); Tong Zhang, Zhejiang (CN)

(73) Assignee: HANGZHOU ZERO ZERO TECHNOLOGY CO., LTD., Zhejiang (CN)

( * ) Notice: Subject to any disclaimer, the term of this patent is extended or adjusted under 35 U.S.C. 154(b) by 328 days.

(21) Appl. No.: 16/108,466

(22) Filed: Aug. 22, 2018

(65) Prior Publication Data
US 2019/0061941 A1 Feb. 28, 2019

Related U.S. Application Data

(60) Provisional application No. 62/551,536, filed on Aug. 29, 2017.

(51) Int. Cl.
*B64C 17/02* (2006.01)
*B64C 27/10* (2006.01)
(Continued)

(52) U.S. Cl.
CPC ............ *B64C 39/024* (2013.01); *B64C 17/02* (2013.01); *B64C 27/10* (2013.01); *B64C 27/14* (2013.01);
(Continued)

(58) Field of Classification Search
CPC ... B64C 17/02; B64C 27/10; B64C 2201/024; B64C 2201/108; B64C 2201/127
See application file for complete search history.

(56) References Cited

U.S. PATENT DOCUMENTS

| 10,054,939 B1* | 8/2018 | Applewhite .......... B64C 39/024 |
| 2014/0091172 A1* | 4/2014 | Arlton ....................... B64C 7/00 244/17.23 |

(Continued)

FOREIGN PATENT DOCUMENTS

| CN | 105539830 A | 5/2016 |
| WO | 2006016018 A | 2/2006 |

OTHER PUBLICATIONS

International Search Report (International Application No. PCT/IB2018/056362); dated Dec. 5, 2018; 9 pages.

*Primary Examiner* — Philip J Bonzell
*Assistant Examiner* — Tye William Abell
(74) *Attorney, Agent, or Firm* — Saliwanchik, Lloyd & Eisenschenk

(57) ABSTRACT

An aerial system includes a body, a propeller coupled to the body, and a motor coupled to the propeller. The motor is configured to rotate the propeller in a first direction, wherein an other portion of the aerial system rotates in an opposing second direction. The other portion of the aerial system that rotation in the opposing second direction may be the body or a second propeller. The aerial system also includes a processing system configured to control the motor to cause the aerial system to hover in a substantially fixed pose, and a camera configured to obtain images of an environment proximate the aerial system while the aerial system is hovering.

15 Claims, 23 Drawing Sheets

(51) Int. Cl.
 *B64C 39/02* (2006.01)
 *B64C 27/14* (2006.01)
 *G05D 1/08* (2006.01)
 *G05D 1/00* (2006.01)
 *G05D 1/10* (2006.01)

(52) U.S. Cl.
 CPC ......... *G05D 1/0094* (2013.01); *G05D 1/0816* (2013.01); *G05D 1/101* (2013.01); *B64C 2201/024* (2013.01); *B64C 2201/108* (2013.01); *B64C 2201/127* (2013.01)

(56) References Cited

U.S. PATENT DOCUMENTS

| | | |
|---|---|---|
| 2015/0129711 A1 | 5/2015 | Caubel |
| 2016/0122012 A1* | 5/2016 | Choo ................ B64C 27/50 |
| | | 244/17.23 |
| 2016/0200418 A1 | 7/2016 | Wang et al. |
| 2016/0375983 A1* | 12/2016 | Yan ................ A63H 33/005 |
| | | 701/4 |

* cited by examiner

AUTONOMOUS SELF-STABILIZING AERIAL SYSTEM AND METHOD

CROSS REFERENCE TO RELATED APPLICATIONS

The subject application claims priority to and all the benefits of U.S. Provisional Application Ser. No. 62/551,536, filed on Aug. 29, 2017, the contents of which are incorporated herein by reference in their entirety.

TECHNICAL FIELD

This invention relates generally to the aerial system field, and more specifically, to an autonomous self-stabilizing aerial system and method.

BACKGROUND OF THE INVENTION

Recently, so-called "selfie drones" have become a popular consumer product category. The hovering ability of those selfie drones enables photo and video taking around people from totally different angles and perspectives. However, these selfie drones typically require a significant amount of remote control and maneuvering from a user while the drone is in the air, thus requiring focus and attention from the user. In addition, taking a photo or a short video clip from an aerial selfie drone is not a trivial matter and often requires a user to counteract the movement of the camera during operation.

SUMMARY OF THE INVENTION

In one aspect of the present invention, an aerial system includes a body, a propeller coupled to the body, and a motor coupled to the propeller. The motor is configured to rotate the propeller in a first direction, wherein an other portion of the aerial system rotates in an opposing second direction. The other portion of the aerial system that rotation in the opposing second direction may be the body or a second propeller. The aerial system also includes a processing system configured to control the motor to cause the aerial system to hover in a substantially fixed pose, and a camera configured to obtain images of an environment proximate the aerial system while the aerial system is hovering.

DETAILED DESCRIPTION OF THE INVENTION

Figure 1:
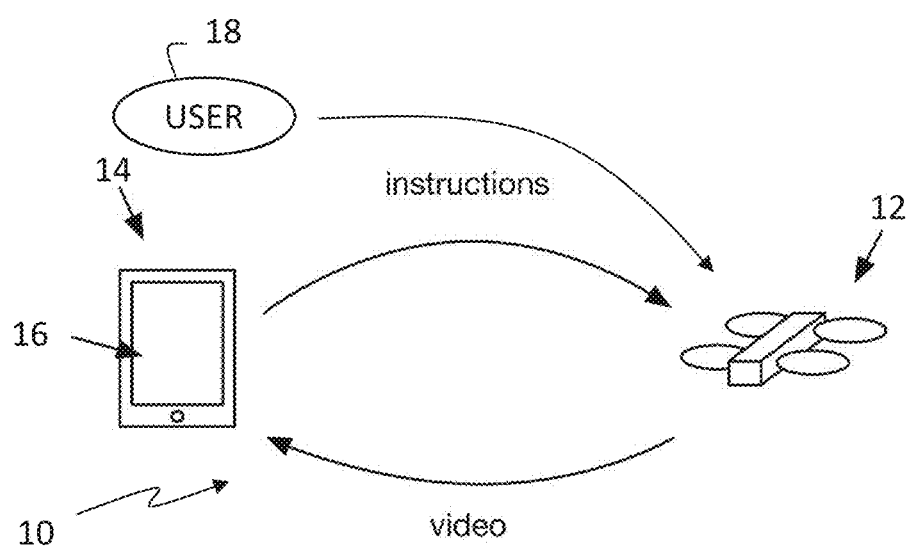
FIG. 1 is a schematic representation of an aerial system and a system for controlling the aerial system, according to an embodiment of the present invention.

An autonomous aerial system is described and illustrated herein. In one embodiment, the aerial system is a so-called "hopter" unmanned aerial vehicle or drone. The aerial system may be activated by a user, released, and may then hover in the air. While hovering, the aerial system may automatically take pictures and videos for the user with minimum interaction or remote control from the user. After the aerial system has completed taking pictures or videos, the aerial system may perform a controlled landing.

In one embodiment, the aerial system includes a propeller having two propeller blades. The propeller blades may be folded down against the body of the aerial system to enable the aerial system to be conveniently stored, handled, and transported. The propeller blades may be moved back into an extended position when the user is ready to operate the aerial system.

The aerial system includes a motor that is configured to rotate the propeller blade in a first direction. To counter a torque generated by such rotation, the body of the aerial system may be configured to counter-rotate in a direction opposite the propeller. Alternatively, the aerial system may include a coaxial arrangement of propellers that counter the torque generated by each propeller. Accordingly, the aerial system may be maintained in a substantially fixed pose while hovering, thus providing an aerodynamically self-stabilized mode of operation. In addition, in some embodiments, one or more stabilizers may be included to increase a stability of the aerial system.

The following description of the embodiments of the invention is not intended to limit the invention to these embodiments, but rather to enable any person skilled in the art to make and use this invention. With reference to the drawings and in operation, a system 10 for controlling an aerial system 12, for example a drone or other unmanned aerial vehicle, is provided. The system 10 may include a remote device 14 with a control client 16. The control client 16 provides a user interface that allows a user 18 to send instructions to the aerial system 12 to control operation thereof. As discussed in more depth below, the aerial system 12 includes one or more cameras for obtaining pictures and/or video which may be sent to the remote device 14 and/or stored in memory on the aerial system 12.

Overview of the System 10 and the Aerial System 12

Figure 2:
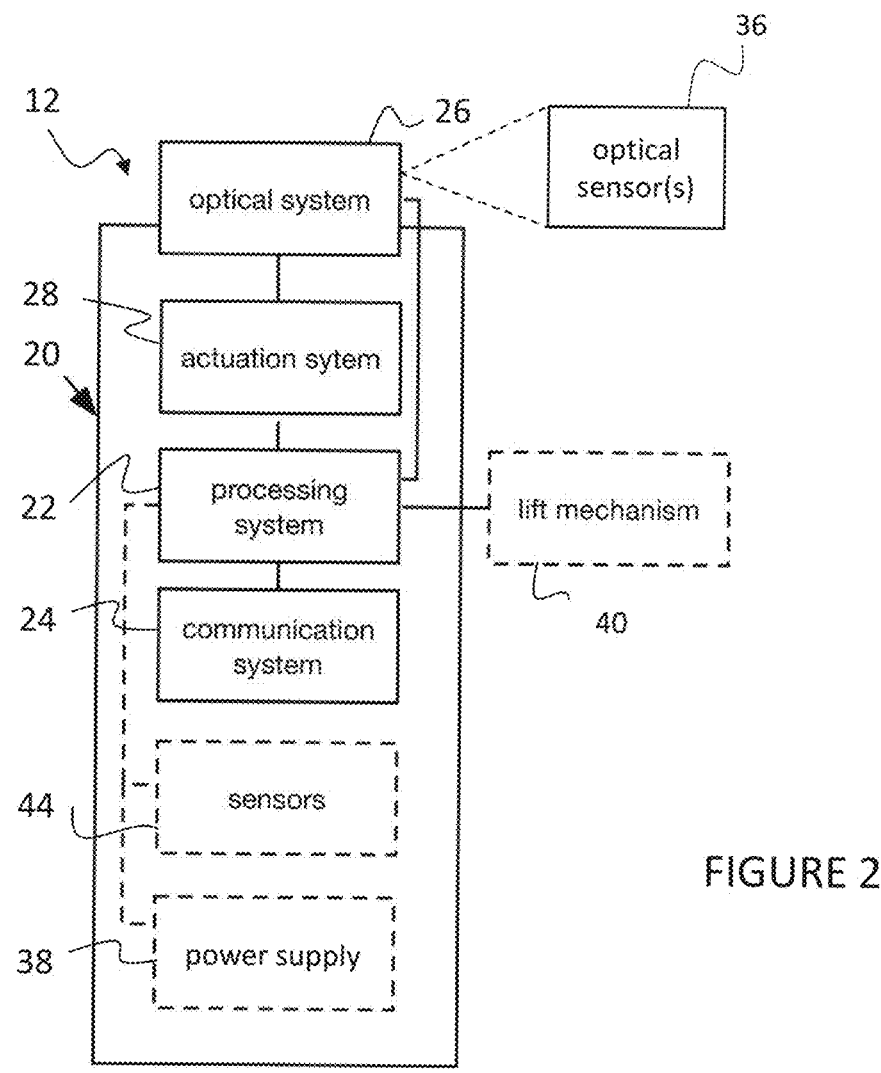
FIG. 2 is another schematic representation of the aerial system, according to an embodiment of the present invention.
Figure 3:
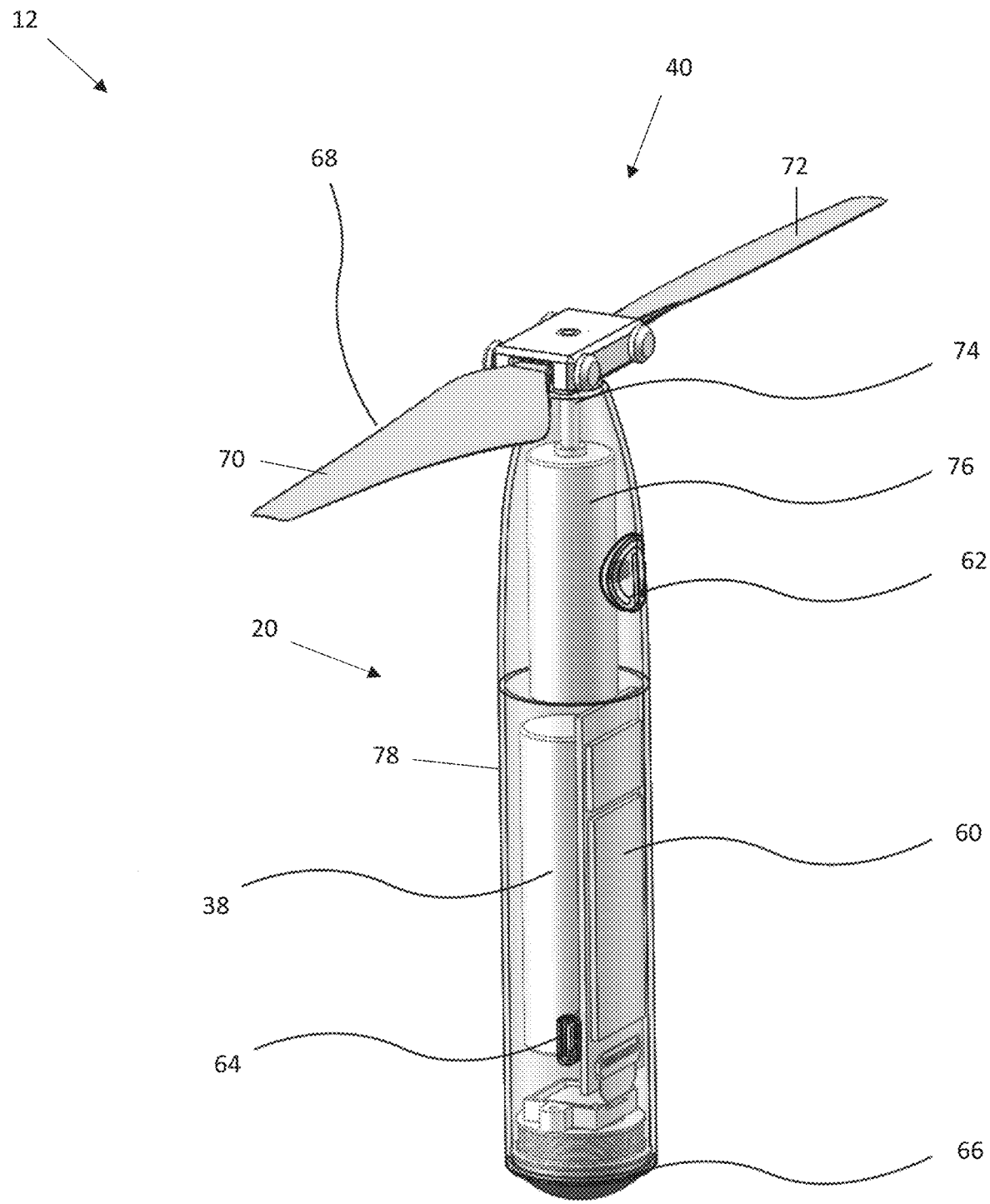
FIG. 3 is a perspective view of the aerial system, according to an embodiment of the present invention.

An exemplary aerial system 12 and control system 10 is shown in FIGS. 1 and 2. The control client 16 of the aerial system 12 functions to receive data from the aerial system 12, including video images and/or video, and control visual display on the remote device 14. The control client 16 may also receive operation instructions and facilitate aerial system 12 remote control based on operation instructions. The control client 16 is preferably configured to execute on a remote device 14, but can alternatively be configured to execute on the aerial system 12 or on any other suitable system. As discussed above, and more fully below, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial system 12 can additionally function to move the optical sensor's field of view within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

The aerial system 12 can perform certain functionality based on onboard processing of sensor data from onboard sensors. This functionality may include, but is not limited to:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As shown in FIG. 2, the aerial system 12 can include a body 20, a processing system 22, a communication system 24, an optical system 26, and an actuation mechanism 28 mounting the optical system 26 to the body 20. The aerial system 12 can additionally or alternatively include one or more optical sensors 36, power supply 38, lift mechanisms 40, additional sensors 44, or any other suitable component (see below).

The body 20 of the aerial system 12 functions to support, mechanically protect, and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The processing system 22 of the aerial system 12 functions to control aerial system operation. The processing system 22 can: stabilize the aerial system 12 during flight (e.g., in an embodiment in which coaxial rotors are used, control the rotors to minimize aerial system wobble inflight); receive, interpret, and operate the aerial system 12 based on remote control instructions; and receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors (e.g., CPU, GPU, microprocessor, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to aerial system components.

The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system 12 functions to send and/or receive information from the remote device 14. The communication system 24 is preferably connected to the processing system 22, such that the communication system 24 sends and/or receives data form the processing system 22, but can alternatively be connected to any other suitable component. The aerial system 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the bottom end of the body 20, but can optionally be mounted to the front, top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 can include a high-definition optical sensor 36, while the second optical system 26 can include a low definition optical sensor 36. However, the optical system or systems 26 can be otherwise configured.

The optical system 26 can include one or more optical sensors 36. The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or supply 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

A lift mechanism 40 of the aerial system 12 functions to enable aerial system flight. The lift mechanism 40 preferably includes a set propeller blades driven by one or more motors (not shown in FIG. 2), but can alternatively include any other suitable propulsion mechanism. The lift mechanism 40 is preferably mounted to the body 20 and controlled by the processing system 22, but can alternatively be otherwise mounted to the aerial system 12 and/or controlled. The aerial system 12 can include multiple lift mechanisms 40. In one example, the aerial system 12 includes four lift mechanisms 40 (e.g., two pairs of lift mechanisms 40), wherein the lift mechanisms 40 are substantially evenly distributed about the perimeter of the aerial system 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial system 12 can additionally include inputs (e.g., microphones, cameras, etc.), outputs (e.g., displays, speakers, light emitting elements, etc.), or any other suitable component.

The aerial system 12 can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., hopter, quadcopter, helicopter, cyclocopter, etc.), but can alternatively be a fixed-wing aircraft, aerostat, or be any other suitable aerial system 12.

The remote computing system may be a remote device 14 that functions to receive auxiliary user inputs, and can additionally function to automatically generate control instructions for and send the control instructions to one or more aerial systems 12. Each aerial system 12 can be controlled by one or more remote computing systems (e.g., one or more remote devices 14). The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. In some embodiments, control of the aerial system 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial system 12.

In at least one embodiment, the aerial system 12 may be controlled without physical interaction with the remote device 14, however, a display of the remote device 14 may be used to display images and/or video relayed from the aerial system 12 which may aid the user 18 in controlling the aerial system 12. In addition, sensors 36, 44 associated with the remote device 14, e.g., camera(s) and/or a microphone (not show) may relay data to the aerial system 12, e.g., when the aerial system 12 is too far away from the user 18. The sensor data relayed from the remote device 14 to the aerial system 12 is used in the same manner as the sensor data from the on-board sensors 36, 44 are used to control the aerial system 12 using user expression.

In this manner, the aerial system 12 may be fully controlled, from start to finish, either (1) without utilization of a remote device 14, or (2) without physical interaction with the remote device 14. Control of the aerial system 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial system 12 includes an optical system 26 that includes one or more optical sensor 36, such as a camera. The at least one on-board camera is configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

With reference to FIGS. 3-6, in further aspects of the present invention, the aerial system 12 may be embodied as a so-called "hopter". In this embodiment, the aerial system 12 includes a lift mechanism 40 coupled to a top portion of the aerial system body 20, a power supply 38, a circuit board 60, an activation interface 62, a data connector 64, and a camera 66. The aerial system 12 may also include other suitable components described above with respect to FIGS. 1 and 2.

Figure 4:
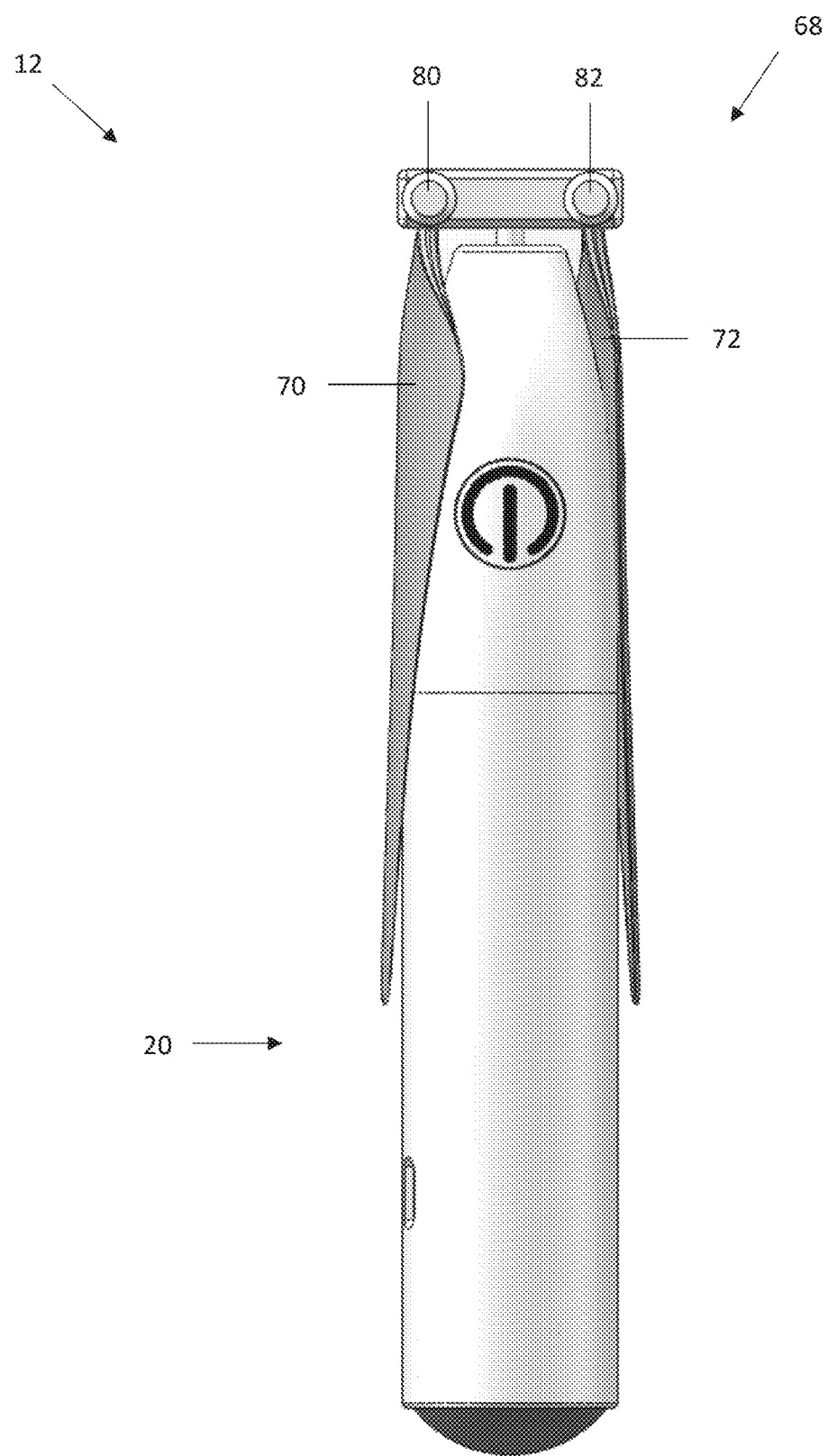
FIG. 4 is a side view of the aerial system with propeller blades in a folded position, according to an embodiment of the present invention.

The lift mechanism 40 may include a single propeller 68 having two propeller blades 70, 72 that are oriented in an opposing manner. Alternatively, the lift mechanism 40 may include a propeller having a single propeller blade, or any suitable number of propellers or propeller blades. The propeller blades 70, 72 may be foldable to minimize the volume while not in use, as shown in FIG. 4.

The lift mechanism 40 may also include a motor shaft 74 coupled to the propeller 68, and a motor 76 coupled to the motor shaft 74 to rotate the propeller 68. The motor 76 can be a DC motor, DC geared motor, brushless DC motor, or any other suitable motor. As the motor 76 rotates the propeller 68, the propeller 68 generates an amount of thrust that is sufficient for the aerial system 12 to hover in a substantially fixed pose, to ascend in vertical direction, or to controllably descend in the vertical direction.

While the embodiments of the lift mechanism 40 described herein have included a single propeller 68 with opposing propeller blades 70, 72, it should be recognized that other propeller configurations may be used. For example, in another embodiment (shown in FIG. 7), a coaxial configuration may be used. In such an embodiment, the torques generated by two (or more) counter-rotating propellers may cancel each other out and allow the body 20 of the aerial system 12 to remain stationary in the rotational direction (i.e., with respect to rotation about a longitudinal axis of the body 20). The propeller blades in this configuration can still be foldable.

The body 20 is encased in a housing 78 that is substantially cylindrical and that may taper inwardly toward the propeller 68. In one embodiment, the housing 78 is formed of a single piece of plastic, aluminum, or another suitable material. Alternatively, the housing 78 may be formed of any suitable number of pieces and/or may be formed of any suitable materials. In an embodiment, the body 20 is rotatable with respect to the propeller 68. More specifically, the body 20 may rotate in an opposing direction to the direction of rotation of the propeller 68 to cancel the rotational torque generated by the rotation of the propeller 68. It should be recognized that the body 20 may rotate at a slower speed than the propeller 68 since the body 20 has a greater moment of inertia than the propeller 68. The body 20 may freely rotate as a result of the torque generated by the propeller 68 to cancel out the torque, or the motor 76 may control the rotation of the body 20 in the opposing direction and speed to cancel out the torque generated by the propeller 68 rotation. The housing 78 also maintains the camera 66 in a fixed position with respect to the body 20.

The power supply 38 provides power to the components of aerial system 12. In one embodiment, power supply 38 includes one or more rechargeable batteries (i.e., a secondary batteries) that may be recharged by power received through data connector 64 or by power received wirelessly through an antenna, as described more fully herein. Alternatively or additionally, power supply 38 may include one or more non-rechargeable batteries (i.e., primary batteries).

The circuit board 60 includes the processing system 22 and the communication system 24 described above with reference to FIG. 2. In addition, the circuit board 60 may include, or may be coupled to, a wireless charging antenna (not shown) which may be used to receive wireless power to charge one or more batteries of the power supply 38.

The processing system 22 may include a sensor fusion module and a control module, in some embodiments. The sensor fusion module may include one or more sensors 44, such as an inertial measurement unit (IMU) (e.g. 3-axis accelerometer plus 3-axis gyro), barometer, magnetometer, sonar, GPS, proximity sensor, vision sensor, etc. In one embodiment, the processing system 22 may receive a video stream from the camera 66 and may use the video stream for vision sensing purposes. In such an embodiment, no additional vision sensor may be needed.

The sensor fusion module can sense the attitude and position of the device before and while it is hovering in the air. A predefined height (e.g., 5 m, or 10 m, etc.) and time of hovering (e.g., 10 seconds, 30 seconds, etc.) can be set in advance, via a mobile device app of a remote device 14 communicating with the communication system 24 of the aerial system 12 via a wireless connection (Wi-Fi and/or Bluetooth). Alternatively, the aerial system 12 may hover indefinitely until the battery has run out or has reached a predetermined state of charge threshold. After the predefined height has been reached, a predefined time of hovering has elapsed, and/or a battery state of charge has reached a predefined threshold (e.g., 5% or 1% of the maximum state of charge), the processing system 22 may cause the aerial system to stop taking pictures and video, and may cause the aerial system 12 to perform a controlled landing. Specifically, the processing system 22 may transmit signals to the motor 76 to cause the motor 76 to reduce an amount of lift generated by the propeller 68, thus causing the aerial system 12 to descend toward the ground at a controlled speed. When the aerial system 12 has reached the ground, the processing system 22 may cause the aerial system 12 to enter a low power state or may cause the power supply 38 to remove power from the aerial system 12, for example.

Since the main body may be spinning slowly as it is hovering in the air, the video recorded by the camera 66 requires post-processing techniques such as electronic image stabilization, etc., so that each frame of the video can be rotated back and aligned to make a smooth-looking video clip. In addition, the processing system 22 may perform automatic detection and tracking (or framing) of a target, automatic photo selection, and automatic editing of the images or video feed received from the camera 66.

The automatic detection and tracking of the target may include using a detection algorithm and a tracking algorithm to detect a target and to combine the outputs of the algorithms with positioning data from sensors 44 to maintain the camera 66 oriented toward the target. Suitable detection algorithms may include face detection algorithms such as Haar+Adaboost, face recognition algorithms such as Eigen-Face, human body detection algorithms such as HOG+SVM or DPM, CNN-based object detection methods, etc. Suitable tracking algorithms may include TLD-tracker, KCF-tracker, Struck-tracker, CNN-based tracker, and the like. The processing system 22 may use these algorithms and the positioning data to transmit signals to a gimbal or other actuator to cause camera 66 to maintain a position directed towards the target even while the body 20 is rotating.

Automatic photo selection may include selecting images and/or video from the images or video stream received from the camera 66 based on a set of predefined parameters. The selected pictures and/or video may be retained ad/or stored or alternatively, marked as being "selected". The set of predetermined parameters may include, but is not limited to: blurriness, exposure, and/or composition. For example, a blurriness detector may utilize either a Laplacian or Gaussian filter or a variance of Laplacian filter or other suitable filter. An exposure detector may calculate an exposure value at regions of interest. The exposure detector may determine that the image or video is underexposed if the value is below a lower threshold, and may determine that the image or video is overexposed if the value is above an upper threshold. A composition detector may receive a target detection signal or data and may determine if the image composition is "good" or "acceptable" (e.g., whether the target is at a good location in the image or video frame) based on the signal or data. For example, the composition detector may determine that the image is good or acceptable if the center of the bounding box of the detected target is within a certain preferred area of view, and may determine that the image is bad or unacceptable if the center of the bounding box of the detected target is not within the preferred area of view.

Automatic editing of the images or video may include editing the images or video based on a set of predetermined editing parameters. The editing parameters may be preselected or modified by the user, for example, using one or more templates.

Other details of post-processing techniques that may be used, such as automatic detection and framing, automatic photo selection, and automatic editing, are described in U.S. Provisional Application Ser. No. 62/479,766, entitled "SYSTEM AND METHOD FOR PROVIDING AUTONOMOUS PHOTOGRAPHY AND VIDEOGRAPHY" and U.S. Non-Provisional application Ser. No. 15/637,954, entitled "SYSTEM AND METHOD FOR PROVIDING AUTONOMOUS PHOTOGRAPHY AND VIDEOGRAPHY", the disclosures of which are hereby incorporated by reference in their entirety. The post processing steps may be performed on board (by processing system 22 or another suitable device or module) or offloaded to a user device, such as remote device 14, after the footages are downloaded via Wi-Fi, Bluetooth, USB, or another suitable protocol.

The activation interface 62 may be operated by a user to initiate operation of the aerial system 12 and to terminate operation of the aerial system 12. In one embodiment, the activation interface 62 is a physical button that the user depresses a first time to initiate operation of the aerial system 12 (e.g., to power on the aerial system 12 and to initiate flight of the system 12) and which the user depresses a second time to terminate operation of the aerial system 12

(e.g., to terminate flight of the aerial system 12 and to power off the system 12). Alternatively, the activation interface 62 may include a light sensor or another suitable sensor that detects the user's finger in proximity to the activation interface 62 to initiate and terminate operation of the aerial system 12. In another embodiment, the user may initiate operation of the aerial system 12 by physically spinning the body 20 of the system between the user's hands, for example, as described below with reference to FIG. 7. After the user has initiated the operation of the aerial system 12 through the activation interface 62, the motor 76 may rotate the propeller 68. The user may then release the aerial system 12 and the aerial system 12 may automatically hover in the place that the user released the aerial system 12, and/or the aerial system 12 may increase or decrease its vertical position based on inputs received from the user's remote device 14 or by recognizing appropriate gesture controls of the user.

The data connector 64 enables the user to charge the power supply 38, to receive still or video images captured by the camera 66, to update software on the aerial system 12, etc. In one embodiment, the data connector 64 is a micro-USB connector that enables the user to connect a remote device 14 to the aerial system 12 via the USB protocol. Alternatively, the data connector 64 may be a USB type C connector, a mini-USB connector, a Thunderbolt™ connector, a Lightning™ connector, or another suitable connector that enables the aerial system 12 to receive power from the remote device 14 and/or to transmit data to the remote device 14. In other embodiments, the data connector 64 may include one or more wireless adapters, or may be incorporated into the communication system 24.

In one embodiment, the camera 66 is an optical sensor 36 within the optical system 26. The camera 66 may be mounted on the bottom of the aerial system body 20. In a specific embodiment, the camera 66 includes an ultra-wide angle fisheye lens that is oriented downward (i.e., towards the ground when the aerial system 12 is upright). Alternatively, the camera 66 may include a normal field of view (FOV) lens facing in another suitable direction. The camera 66 can be fixed on the body 20 of the aerial system 12, thus providing a constant relative pose to the body 20, or can rotate along one or multiple axes to provide a gimbal functionality. The camera 66 may generate images of the ambient environment surrounding the system 12, or proximate the system 12, and may transmit the images to the processing system 22. The processing system 22 may sample the images for real-time or near-real-time image processing, such as depth analysis. The processing system 22 can additionally or alternatively generate 3D video, generate a map of the monitored region, or perform any other suitable functionality.

The camera 66 can be a CCD camera, CMOS camera, or any other suitable type of camera. The camera 66 can be sensitive in the visible light spectrum, IR spectrum, or any other suitable spectrum. The camera 66 can be hyperspectral, multispectral, or capture any suitable subset of bands. The camera 66 can have a fixed focal length, adjustable focal length, or any other suitable focal length. However, the camera 66 can have any other suitable set of parameter values.

During operation, the user may operate the activation interface 62 of the aerial system 12 while holding the body 20 of the aerial system 12 in a desired pose. The activation interface 62 transmits an activation signal to the processing system 22. In response, the processing system 22 causes the power supply 38 to provide power to the components of the aerial system 12. The processing system 22 also transmits a signal to the motor 76 to cause the motor 76 to begin rotating the propeller 68 via the motor shaft 74. The processing system 22 may also receive signals representative of the rotational speed of the motor shaft 74 or propeller 68. The rotation of the propeller 68 causes lift to be generated in a sufficient amount to enable the aerial system 12 to hover in place. The processing system 22 may modulate the signal transmitted to the motor 76 to cause the motor 76 to adjust the rotation speed of the motor shaft 74 and propeller 68 to provide a desired amount of lift.

As the lift is generated, the user may release the aerial system 12 to enable the aerial system 12 to hover in place. Additionally, the user may operate the remote device 14, or may use recognized gesture controls, to cause the aerial device 12 to increase or decrease in altitude by a controlled amount. When the aerial system 12 is hovering or is otherwise in operation, the aerial system 12 may use the camera 66 to automatically record images or videos of the user and/or of the user's environment. The camera 66 may continuously or periodically record the images or videos after the aerial system 12 begins operating, or after a predetermined time has elapsed since the aerial system 12 began operation. Alternatively, the user may also operate the remote device 14, or may use gesture controls, to cause the aerial system 12 to obtain images from the camera 66, or to initiate or terminate video recording by the camera 66. The images and videos may be stored as image and video files in memory within the aerial system 12. Thus, the user may operate the aerial system 12 to take pictures or videos of the user and/or of the user's environment as desired. The user may retrieve the images and/or videos by downloading the image or video files from the aerial device either wirelessly or through the data connector 64, for example.

Figure 5:
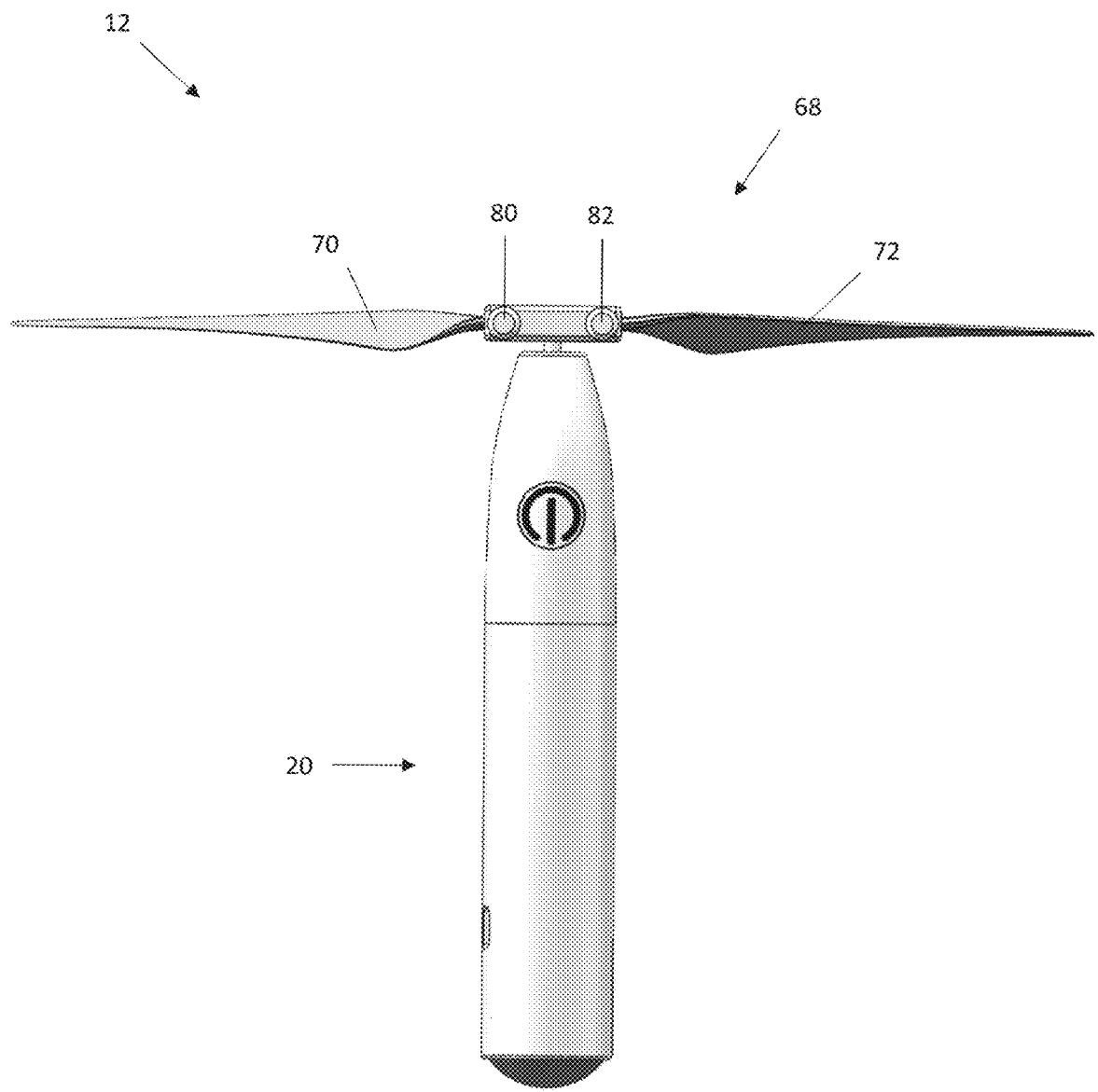
FIG. 5 is a side view of the aerial system with propeller blades in an extended position, according to an embodiment of the present invention.

Referring to FIGS. 4 and 5, the propeller 68 of aerial system 12 may be foldable to enable the aerial system 12 to be conveniently stored and transported while not in operation. FIG. 4 illustrates the propeller 68 in a folded position, while FIG. 5 illustrates the propeller 68 in an extended position.

Accordingly, as illustrated in FIG. 4, the propeller blades 70, 72 may pivot about respective coupling members 80, 82 into the folded position in which the propeller blades 70, 72 are substantially flush with the housing 78 (i.e., substantially aligned with the longitudinal axis of the housing 78 and the body 20). The coupling members 80, 82 may include one or more pins, bolts, or the like that pivotally couple the propeller blades 70, 72 to the body 20. The propeller blades 70, 72 may be pivoted manually into the folded position by the user applying force to the propeller blades 70, 72 toward the folded position, or may be pivoted automatically by an actuator or motor (not shown) that is controlled by the processing system 22, for example.

As illustrated in FIG. 5, the propeller blades 70, 72 may also pivot about the coupling members 80, 82 back into the extended position in which the propeller blades 70, 72 are substantially perpendicular to the housing 78 (i.e., substantially perpendicular to the longitudinal axis of the housing 78 and the body 20). The propeller blades 70, 72 may be pivoted manually into the extended position by the user applying force to the propeller blades 70, 72 away from the folded position, or may be pivoted automatically by an actuator or motor that is controlled by the processing system 22, for example.

Figure 6:
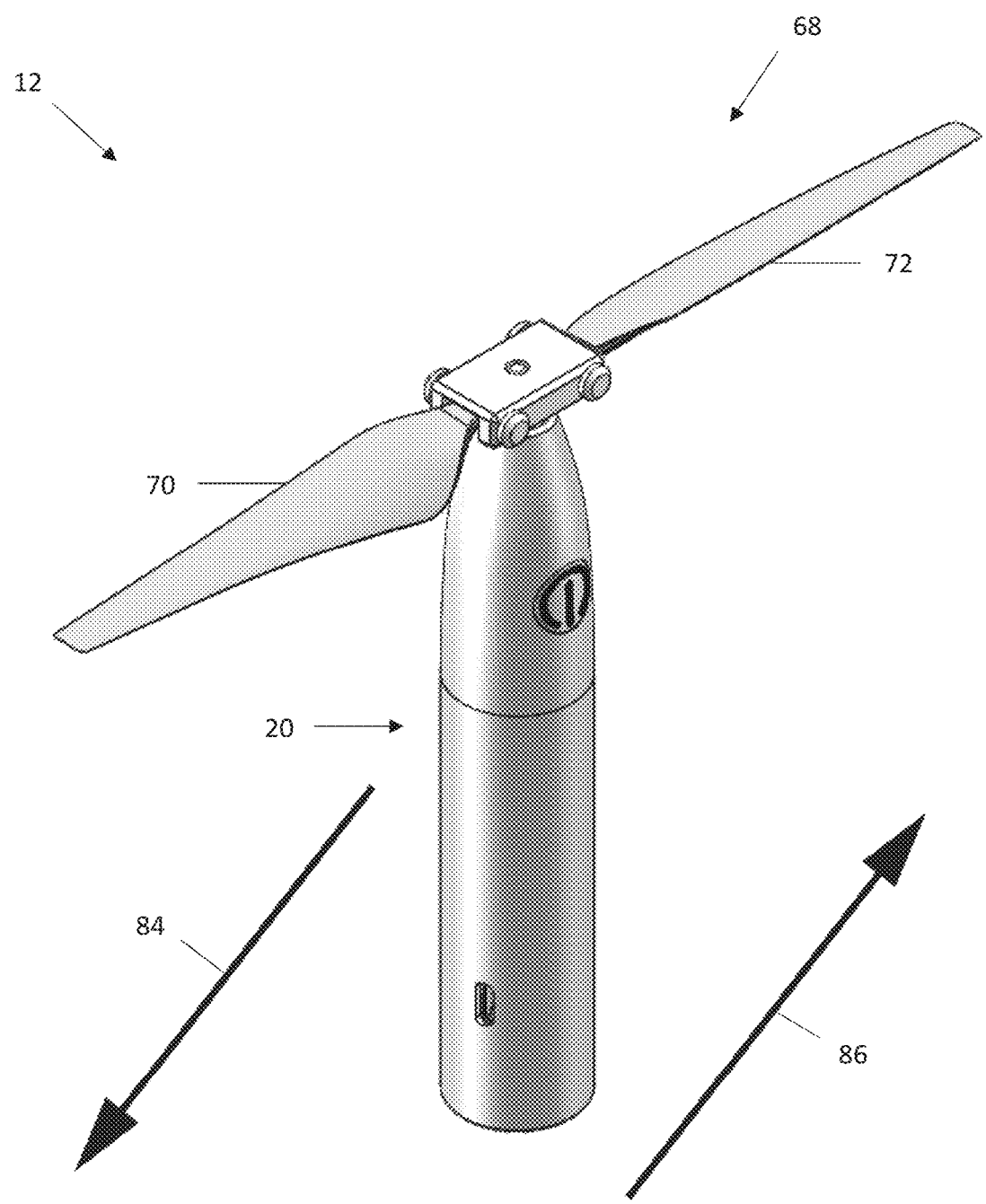
FIG. 6 is a perspective view of the aerial system illustrating an alternative activation mechanism, according to an embodiment of the present invention.

FIG. 6 is a perspective view of the aerial system 12 illustrating an alternative mechanism for initiating operation of the aerial system 12. As noted above, the user may initiate the operation of the aerial system 12 by rotating the body 20 of the aerial system in a rotational direction about the longitudinal axis of the body 20. For example, the user may place the body 20 of the aerial system 12 between the palms of his or her hands and may rapidly move the palms past each other to impart rotation to the body 20. In other words, the user may cause the first hand to move in a first direction 84 and may cause the second hand to move in a second direction 86 opposite the first direction 84. The processing system 22 may operate a sensor to detect the imparted rotation of the body 20. For example, the processing system 22 may receive signals from an IMU (or another sensor 44) and may determine a rotational speed or force imparted to the body 20 about the longitudinal axis. The processing system 22 may compare the determined rotational speed or force to a threshold to determine whether an activation event has occurred. If the rotational speed or force exceeds the threshold such that an activation event has occurred, the processing system 22 may initiate operation of the aerial system 12 by causing the power supply 38 to provide power to the aerial system 12 components and by causing the motor 76 to begin rotating the propeller 68. Conversely, if the rotational speed or force is equal to or less than the threshold, the processing system 22 may determine that an activation event has not occurred and may not initiate operation of the aerial system 12.

Figure 7:
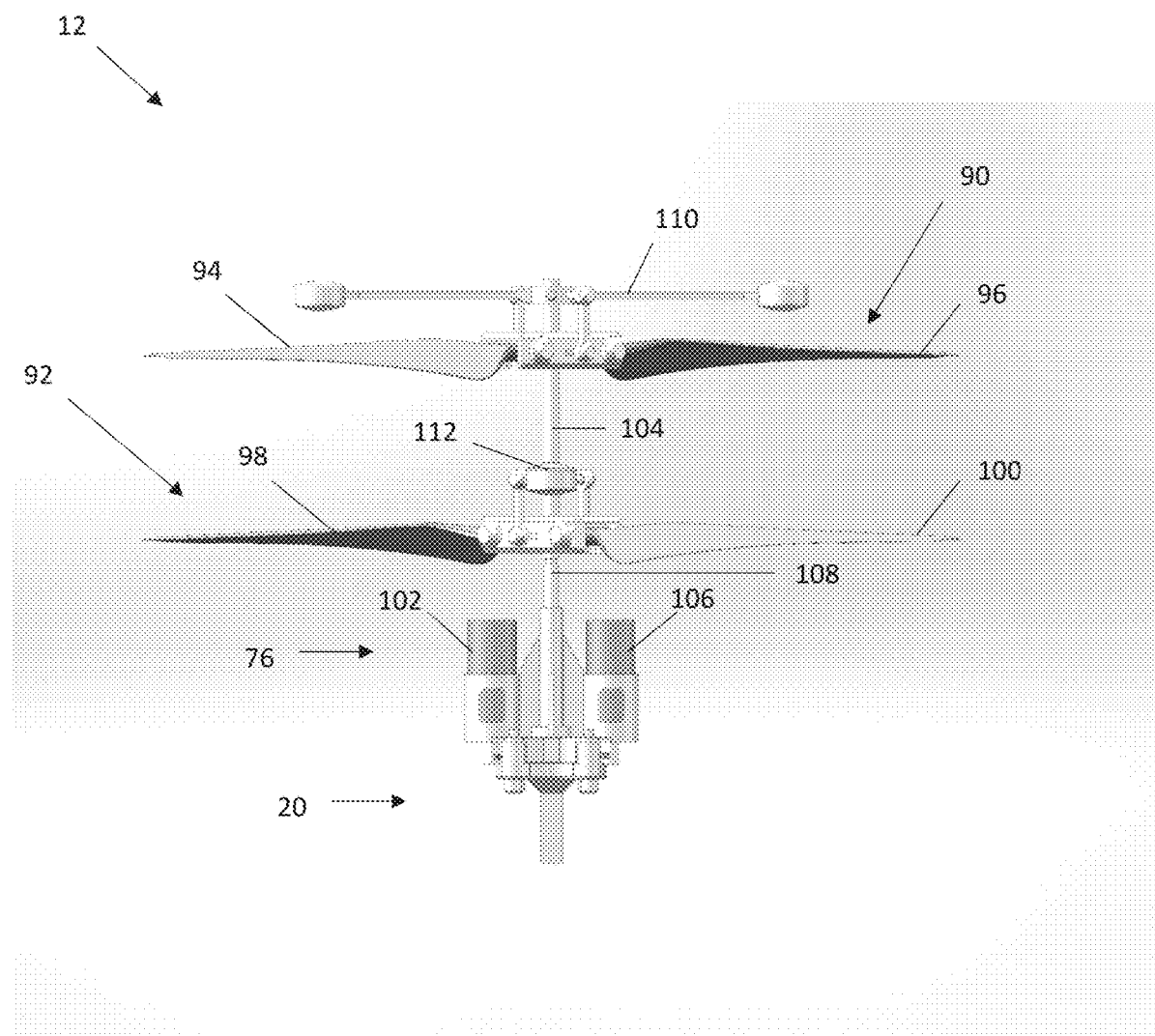
FIG. 7 is a side view of the aerial system illustrating a coaxial propeller arrangement, according to another embodiment of the present invention.

FIG. 7 is a perspective view of an alternative embodiment of the aerial system 12. In the embodiment illustrated in FIG. 7, the aerial system 12 includes two coaxial propellers 90, 92 that are positioned in opposing locations with respect to the aerial system body 20. Each propeller includes two opposing propeller blades. Accordingly, propeller 90 include propeller blades 94, 96, and propeller 92 includes propeller blades 98, 100. Propellers 90, 92 may be controlled by the processing system 22 and one or more motors 76 to rotate in opposite directions at the same speed to cause the torque generated by each propeller to cancel out the torque generated by the other propeller. The body 20 of the aerial system 12 may thus remain stationary in the rotational direction about the longitudinal axis of the body 20.

In the embodiment shown in FIG. 7, each propeller 90, 92 is rotated by a separate motor 76 about a respective drive shaft. Accordingly, in a specific embodiment, propeller 90 is rotated by a motor 102 about an upper drive shaft 104 and propeller 92 is rotated by a motor 106 about a lower drive shaft 108. Motors 102, 106 are positioned on opposite sides of the body 20 to enable the body 20 to remain balanced.

In both single and coaxial configurations, one or more stabilizers may be added to increase a stability of the aerial system 12. For example, in the embodiments shown in FIGS. 7 and 8, an upper stabilizer 110 may be coupled to the upper drive shaft 104 to facilitate stabilizing the aerial system 12 during operation. In addition, a lower stabilizer 112 may be provided in addition to the upper stabilizer 110. The lower stabilizer 112 may be coupled to the lower drive shaft 108 to provide additional stability to the aerial system 12. In the embodiments shown in FIGS. 7 and 8, the upper stabilizer 110 may reduce a torque induced to the body 20 by the propeller 90 and the lower stabilizer 112 may reduce a torque induced to the body 20 by the propeller 92. Thus, the stabilizers 110 and/or 112 may enable the aerial system 12 to operate in a more stable manner than in embodiments that do not include the stabilizers 110 and/or 112.

Figure 8:
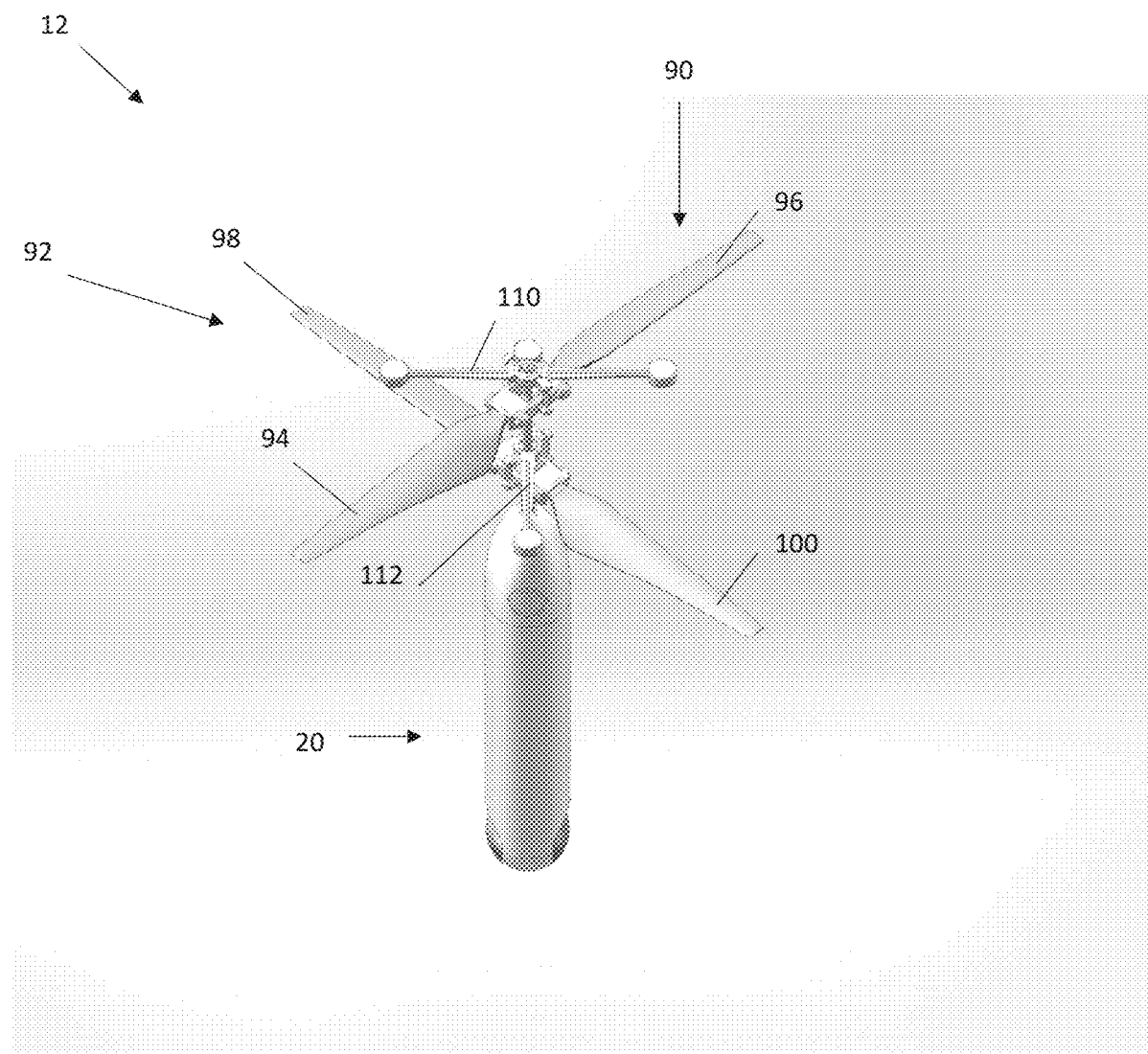
FIG. 8 is a perspective view of the aerial system illustrating a coaxial propeller arrangement, according to another embodiment of the present invention.
Figure 9:
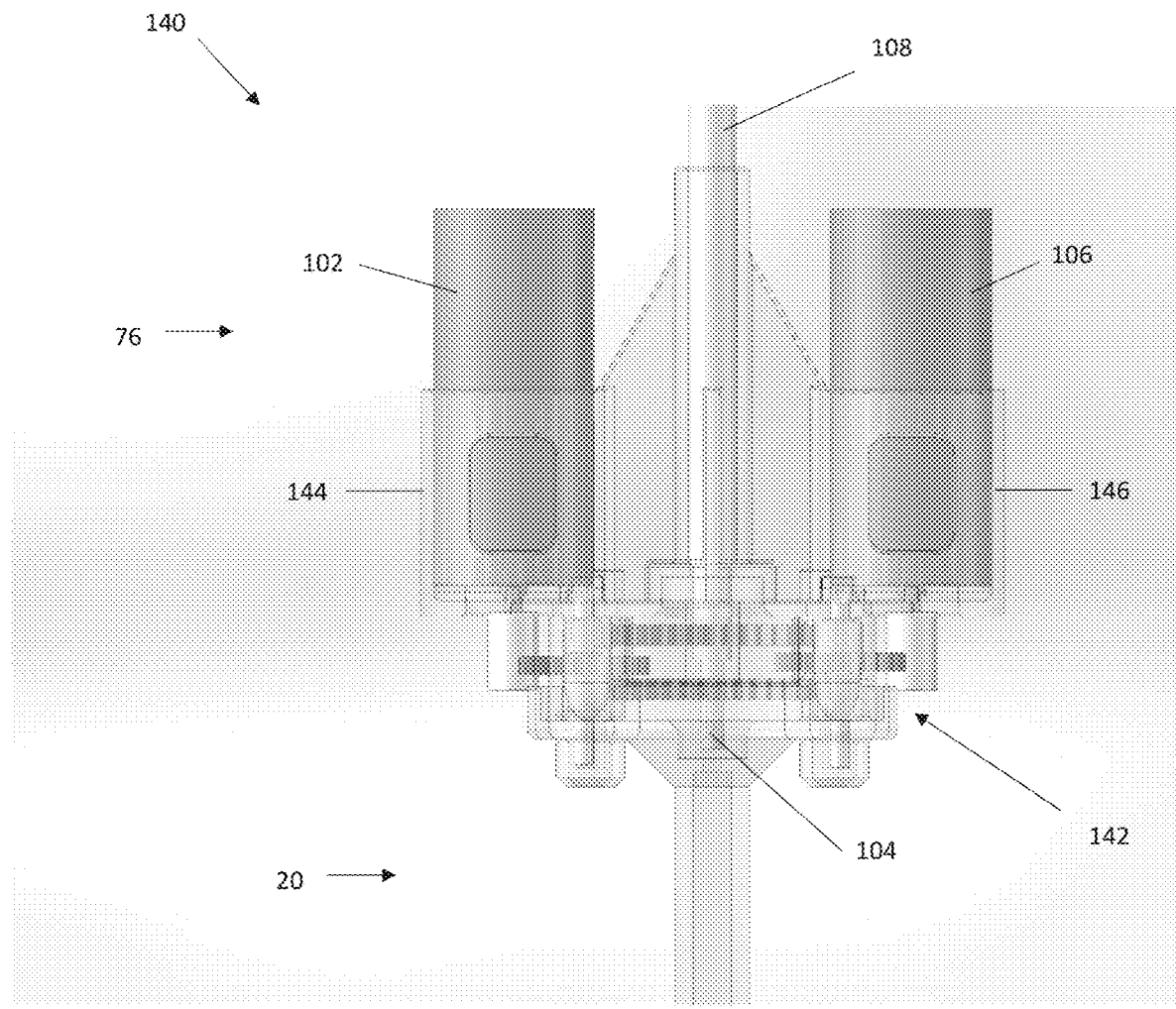
FIG. 9 is a side view of a motor assembly of the aerial system, according to an embodiment of the present invention.

FIG. 9 is a side view of an exemplary motor assembly 140 that may be used with the coaxial configuration of the aerial system 12 (e.g., the coaxial configuration shown in FIGS. 7 and 8). In one embodiment, the motor assembly 140 includes a gear assembly 142 and motors 102, 106. The motor 102 is coupled to the gear assembly 142 to enable the motor 102 to rotate the upper drive shaft 104 in response to receiving control signals from the processing system 22. The motor 106 is coupled to the gear assembly 142 to enable the motor 106 to rotate the lower drive shaft 108 in response to receiving control signals from the processing system 22. The motor 102 is positioned within a first motor housing 144 that is coupled to the body 20, and the motor 106 is positioned within a second motor housing 146 that is coupled to the body 20 opposite the first motor housing 144 to facilitate maintaining a balance of weight of the body 20.

Figure 10:
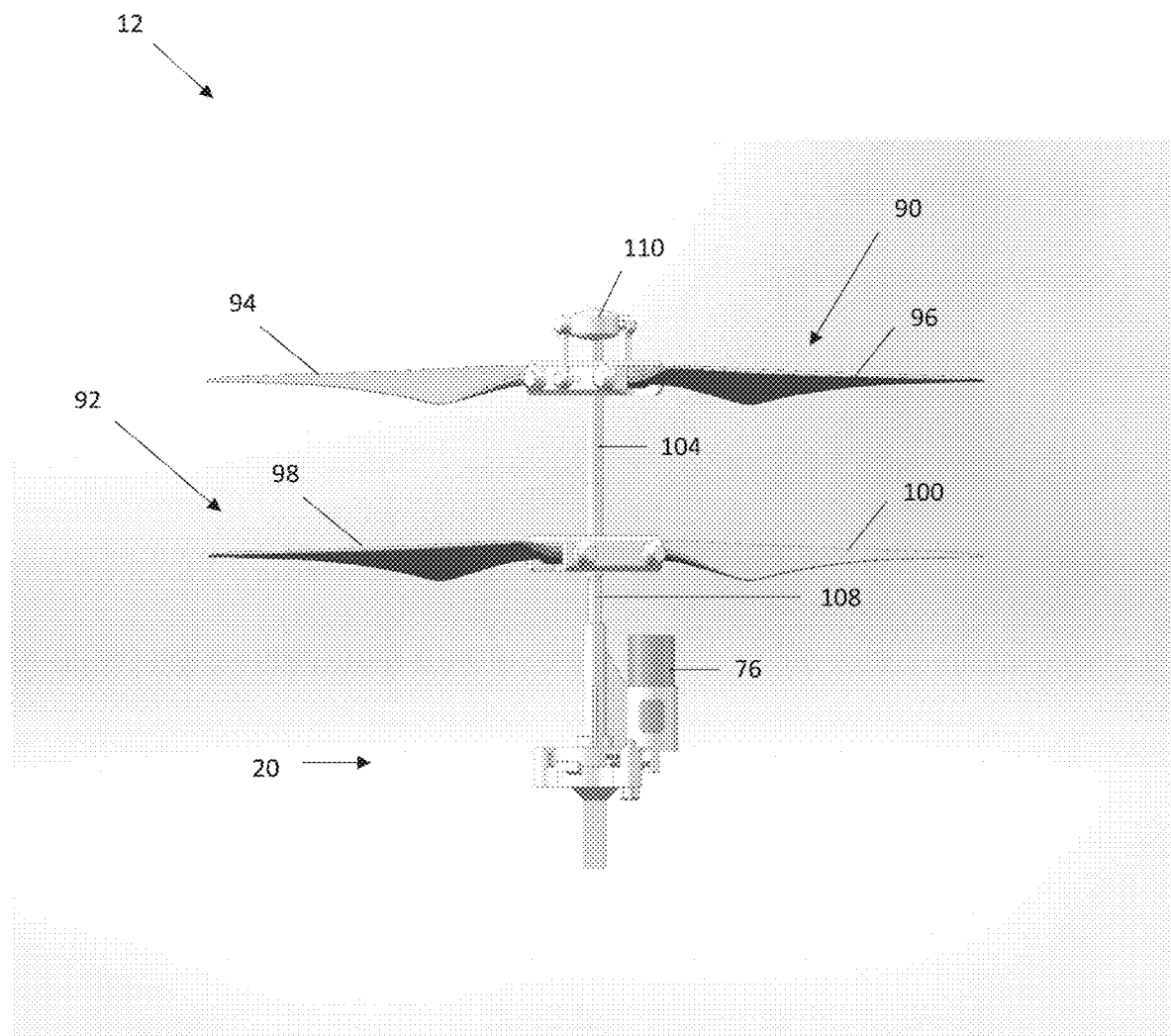
FIG. 10 is a side view of the aerial system illustrating another coaxial propeller arrangement, according to an embodiment of the present invention.
Figure 11:
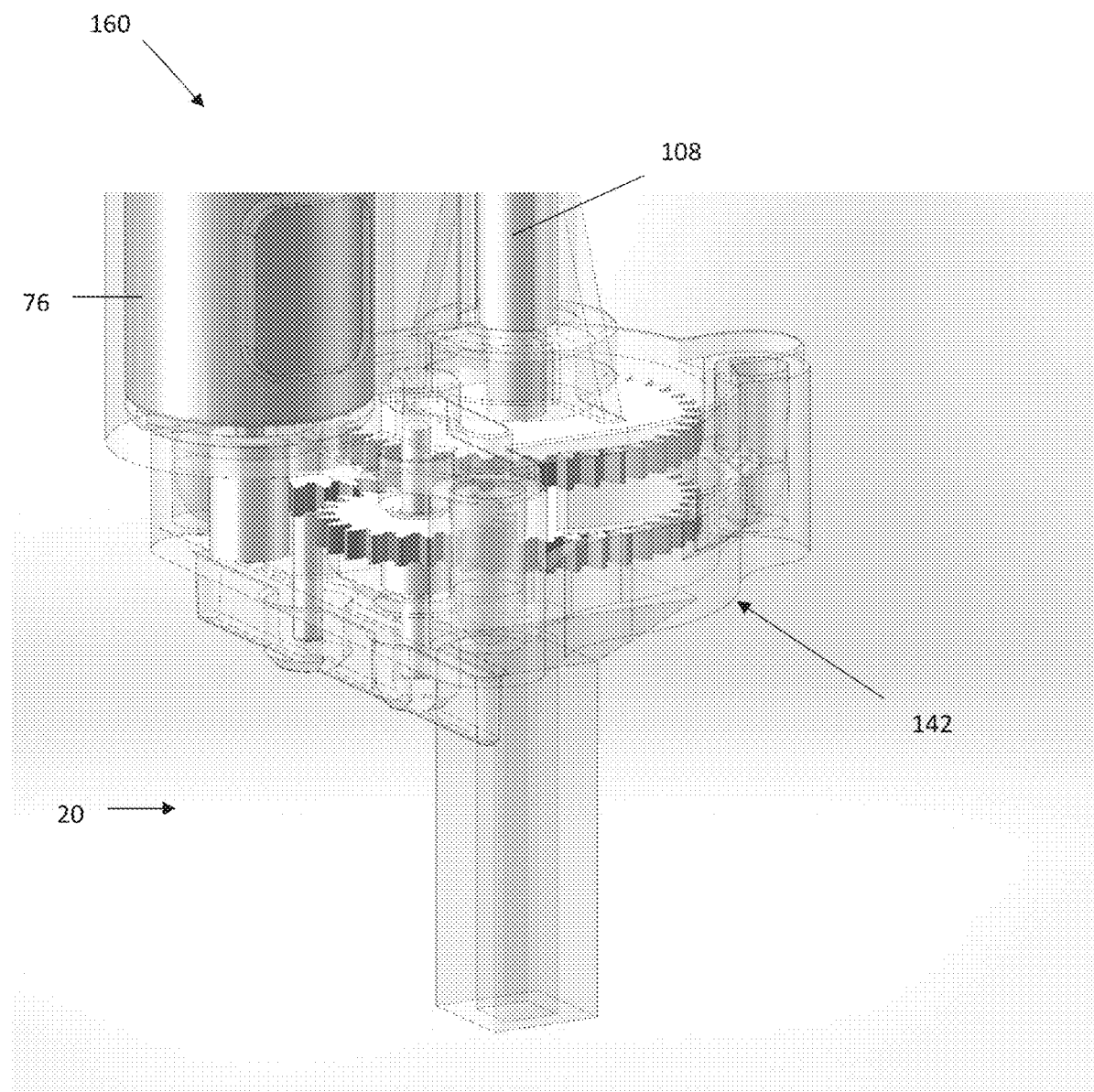
FIG. 11 is a side view of another motor assembly of the aerial system, according to an embodiment of the present invention.

FIG. 10 is a side view of an alternative embodiment of the aerial system 12 that includes a single motor 76 configured to rotate both propellers 90, 92 of a coaxial propeller configuration. FIG. 11 is a perspective view of another motor assembly 160 that may be used with the single motor 76 configuration of the aerial system 12 shown in FIG. 10.

In the embodiment shown in FIG. 11, the motor assembly 160 includes the gear assembly 142 and a single motor 76 for rotating both the upper drive shaft 104 and the lower drive shaft 108. Accordingly, in this embodiment, the motor 76 may be coupled to the gear assembly 142 to cause both propellers 90, 92 to rotate in response to control signals received from the processing system 22.

Figure 12:
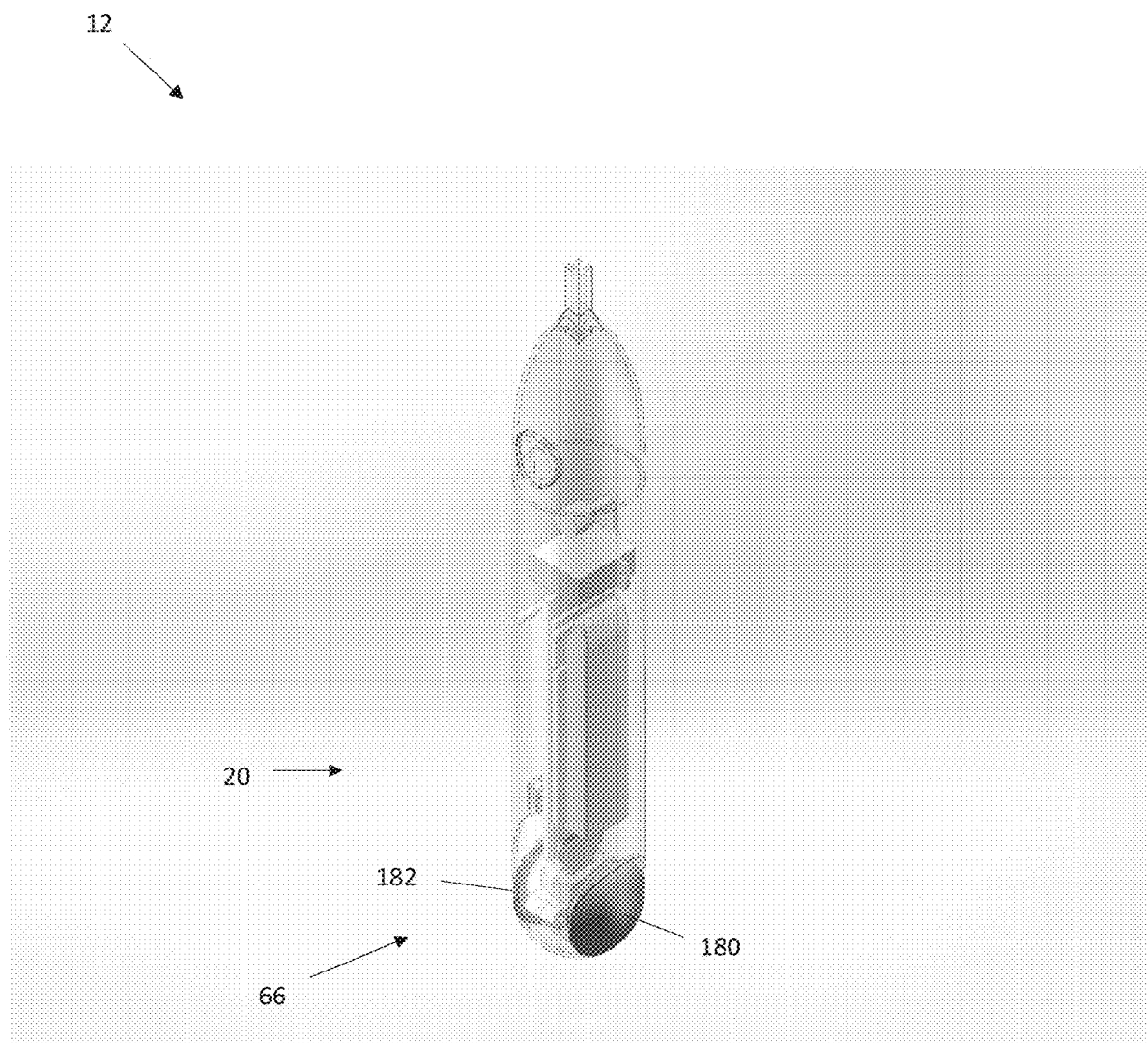
FIG. 12 is a perspective view of a portion of the aerial system, according to another embodiment of the present invention.

FIG. 12 is a partial perspective view of the aerial system 12 including a pair of cameras 66. Specifically, FIG. 12 illustrates a first camera 180 and a second camera 182 coupled to a bottom portion of the body 20 of the aerial system 12. In one embodiment, the first camera 180 and the second camera 182 are fisheye cameras that each have a field of view of at least 180 degrees. Accordingly, in this embodiment, the first camera 180 and the second camera 182 may operate together to provide a 360 degree view of the environment surrounding the aerial system 12. The processing system 22 is coupled to the first camera 180 and the second camera 182 and receives images from the first camera 180 and second camera 182. The processing system 22 may sample the images and/or analyze the images in a similar manner as described above with reference to FIGS. 3-6.

Figure 13:
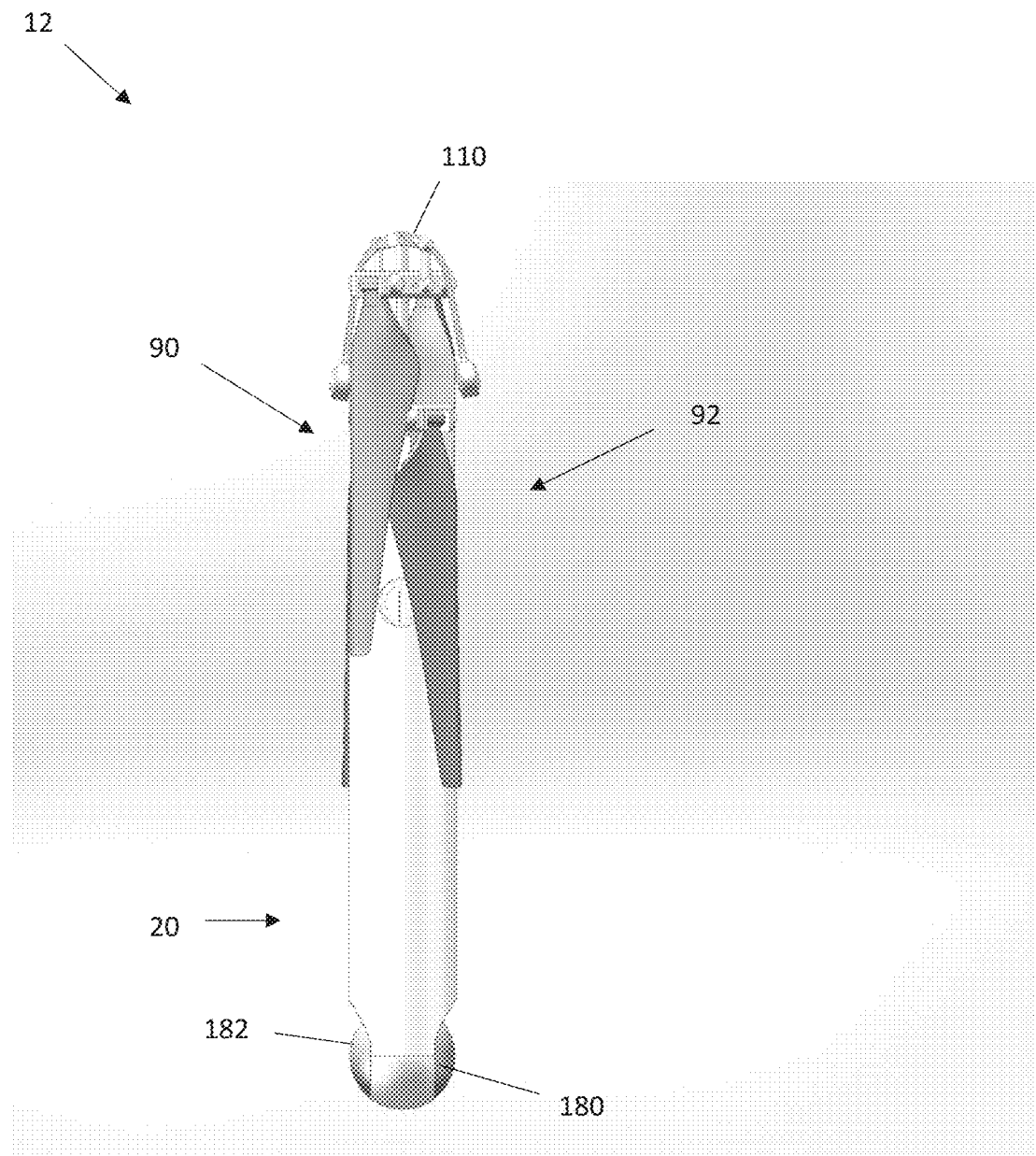
FIG. 13 is a side view of the aerial system, according to another embodiment of the present invention.

FIG. 13 illustrates a coaxial configuration of the aerial system 12 in which the stabilizers 110, 112 and propellers 90, 92 may be folded toward or against the body 20 when not in use, for example. Accordingly, in this embodiment, each propeller 90, 92 is coupled to the body 20 at a respective pivot point, about which the propellers 90, 92 may pivot toward or against the body 20. Likewise, the stabilizers 110, 112 may be coupled to the body 20 at a respective pivot point, about which the stabilizers 110, 112 may pivot toward or against the body 20. When the user desires to operate the aerial system 12, for example, the user may pivot the propellers 90, 92 and stabilizers 110, 112 away from the body 20 into an extended position to enable the aerial system 12 to begin operation.

FIG. 14 illustrates a tilt mechanism 200 that may be coupled to, or otherwise included within, the aerial system 12. FIG. 15 is a side view of the aerial system 12 when the tilt mechanism 200 is in operation.

Figure 14A:
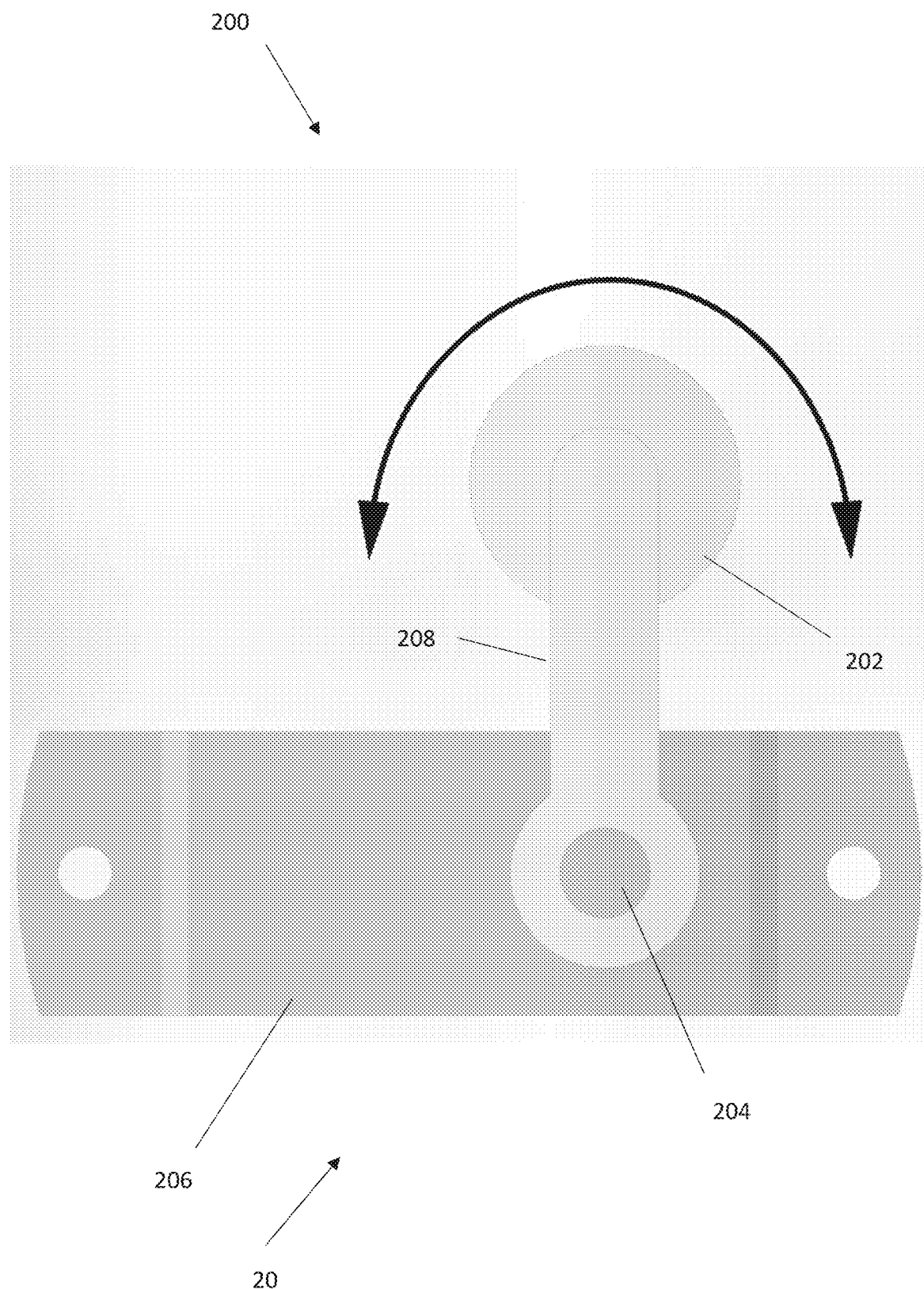
FIG. 14A is a first side view of a tilt mechanism that may be used with the aerial system, according to an embodiment of the present invention.
Figure 14B:
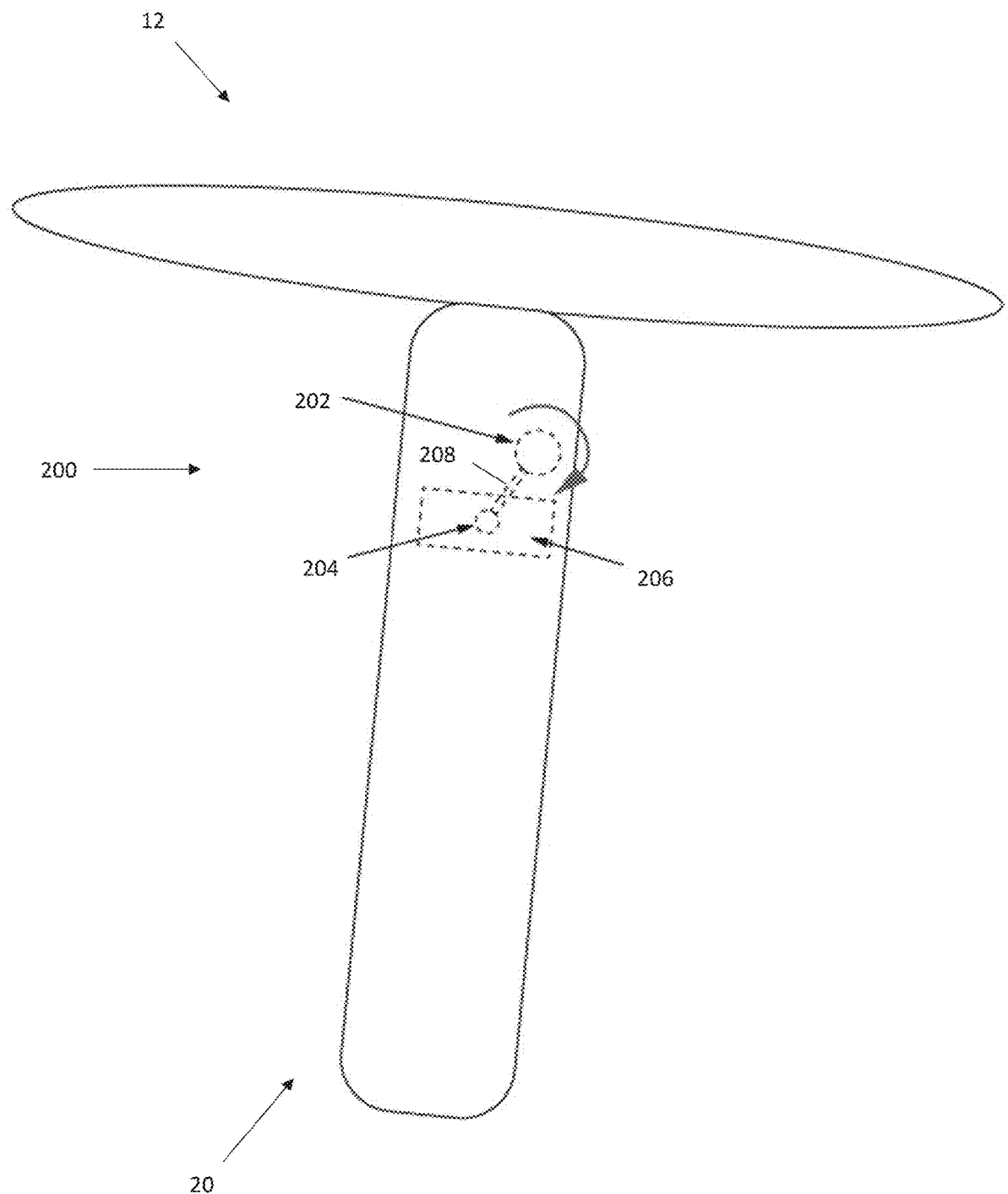
FIG. 14B is a second side view of the tilt mechanism of FIG. 14A.
Figure 15:
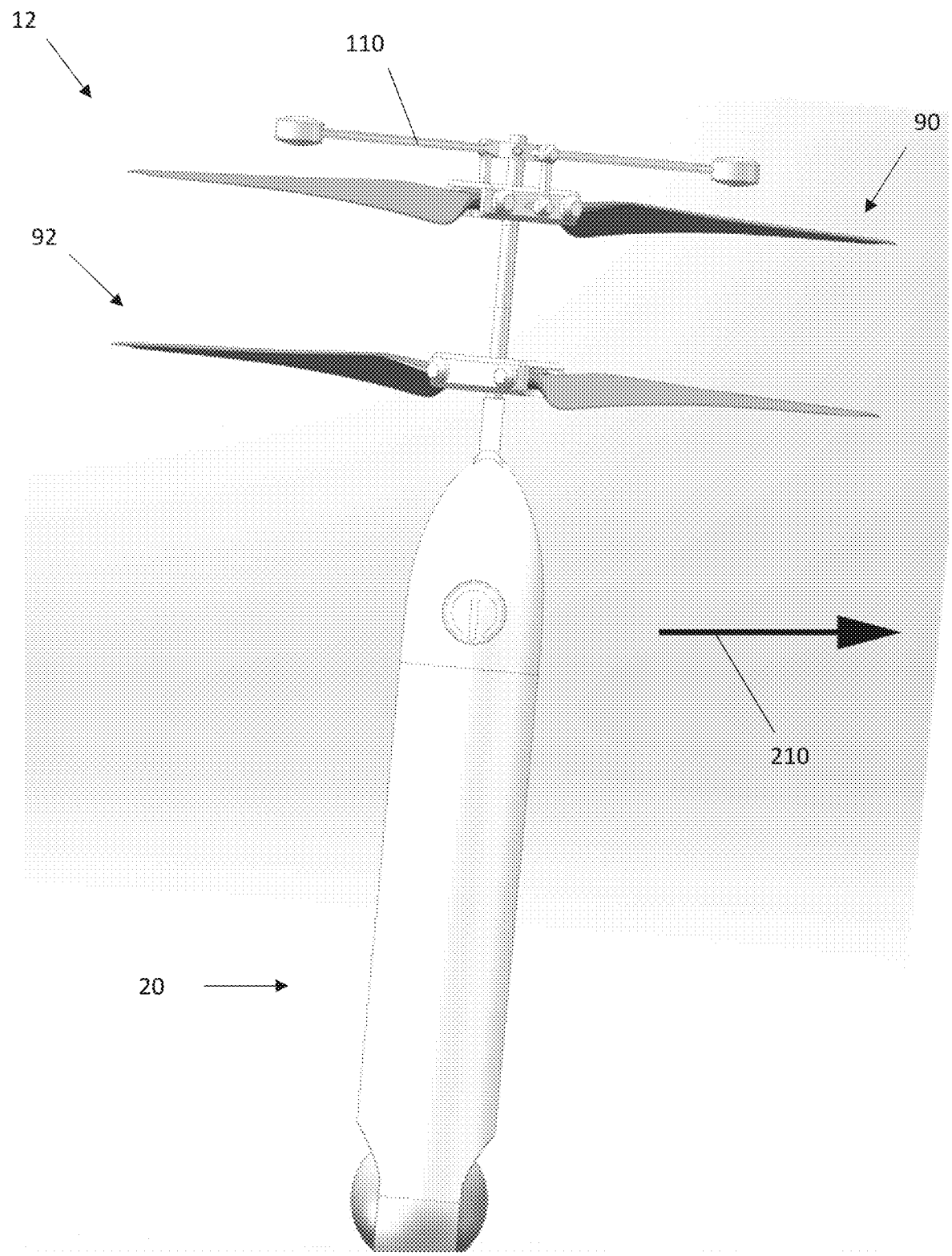
FIG. 15 is a perspective view of the aerial system during operation of the tilt mechanism, according to an embodiment of the present invention.

Referring to FIGS. 14A and 14B, the tilt mechanism 200 may include a mass 202 that is coupled to a portion of the body 20 at a pivot point 204. A motor 206 and a shaft 208 are configured to cause the mass 202 to pivot about the pivot point 204 in response to control signals received from the processing system 22. In one embodiment, the processing system 22 may transmit control signals to the motor to cause the motor to pivot the mass 202 into a desired position. For example, the mass 202 may be pivoted toward one side of the body 20 to change the center of gravity of the body 20 to correspond to the position of the mass 202. In such a manner, the body 20 may be tilted (as illustrated in FIG. 15) with respect to the gravity vector and the thrust generated by the propellers may be angled with respect to the gravity vector in such a manner as to cause the aerial system 12 to move in a desired direction 210.

Figure 16:
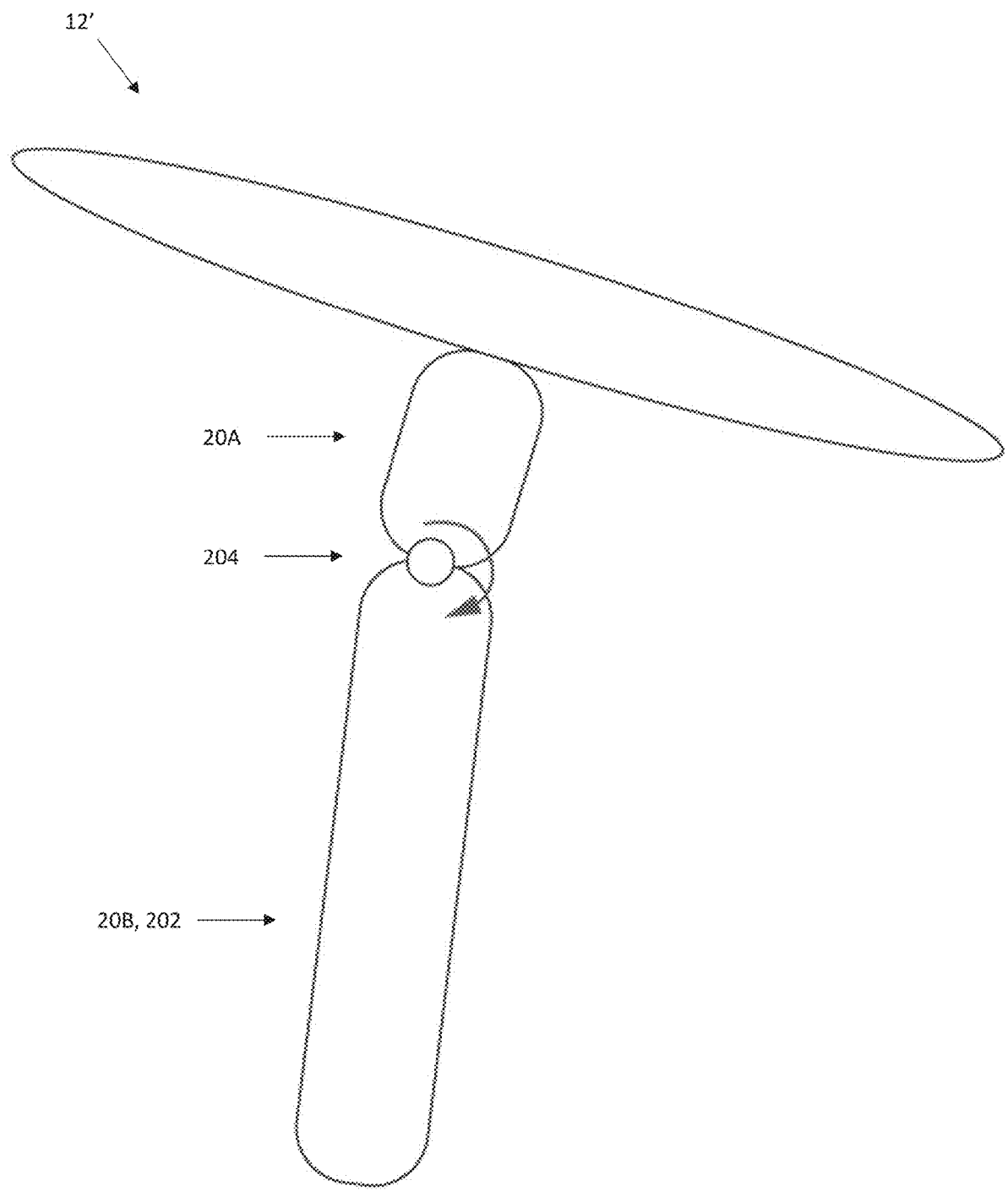
FIG. 16 is a side view of a tilt mechanism according to an alternative embodiment of the present invention.
Figure 17:
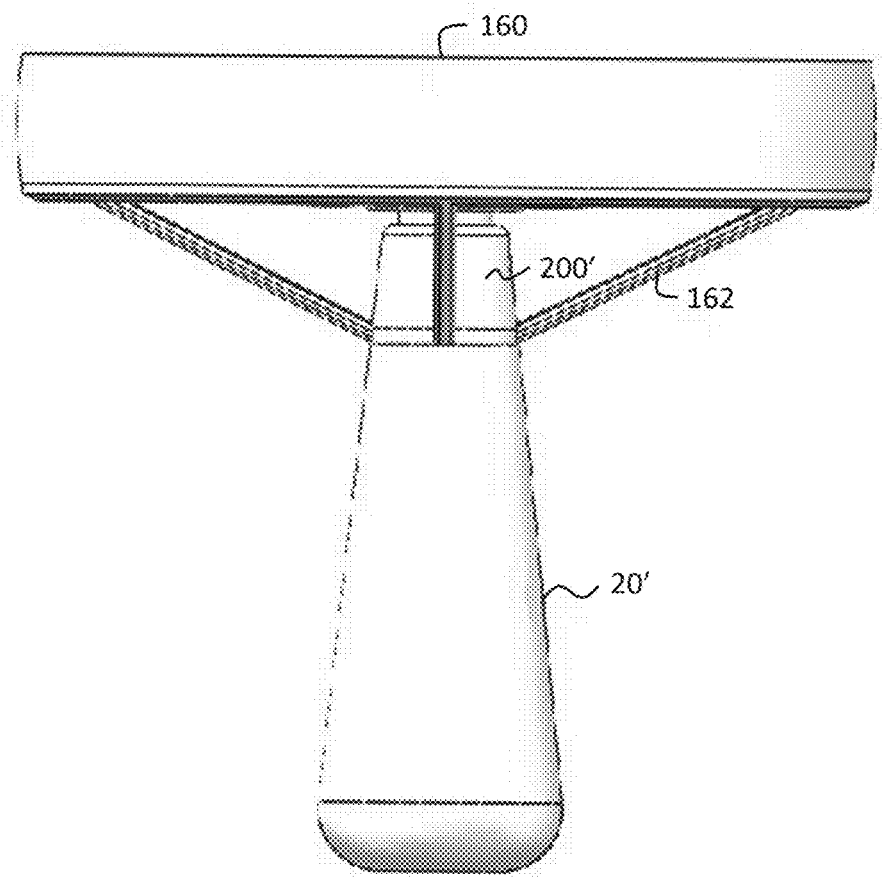
FIGS. 17-22 are schematics view of an aerial system according to another embodiment of the present invention.
Figure 18:
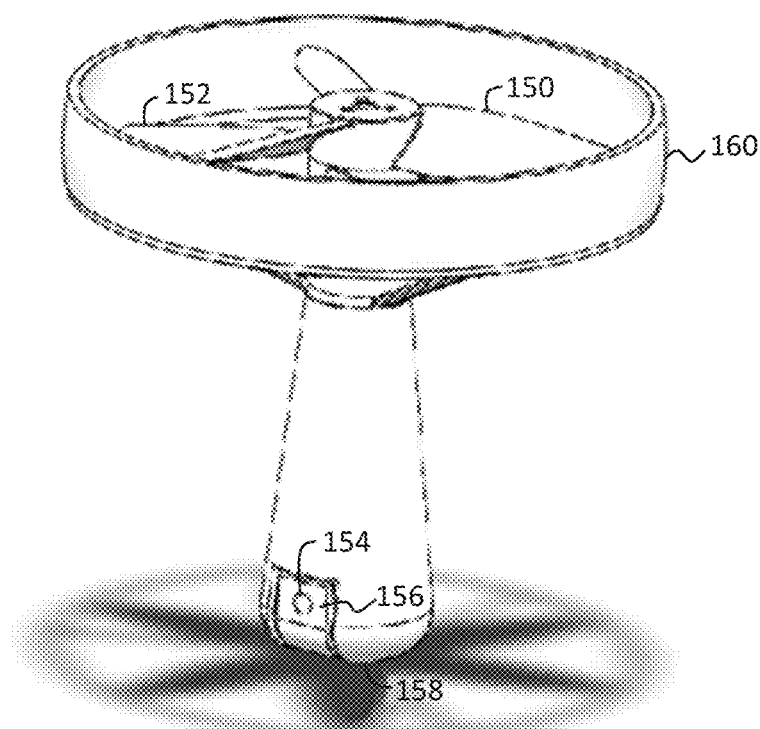
Figure 19:
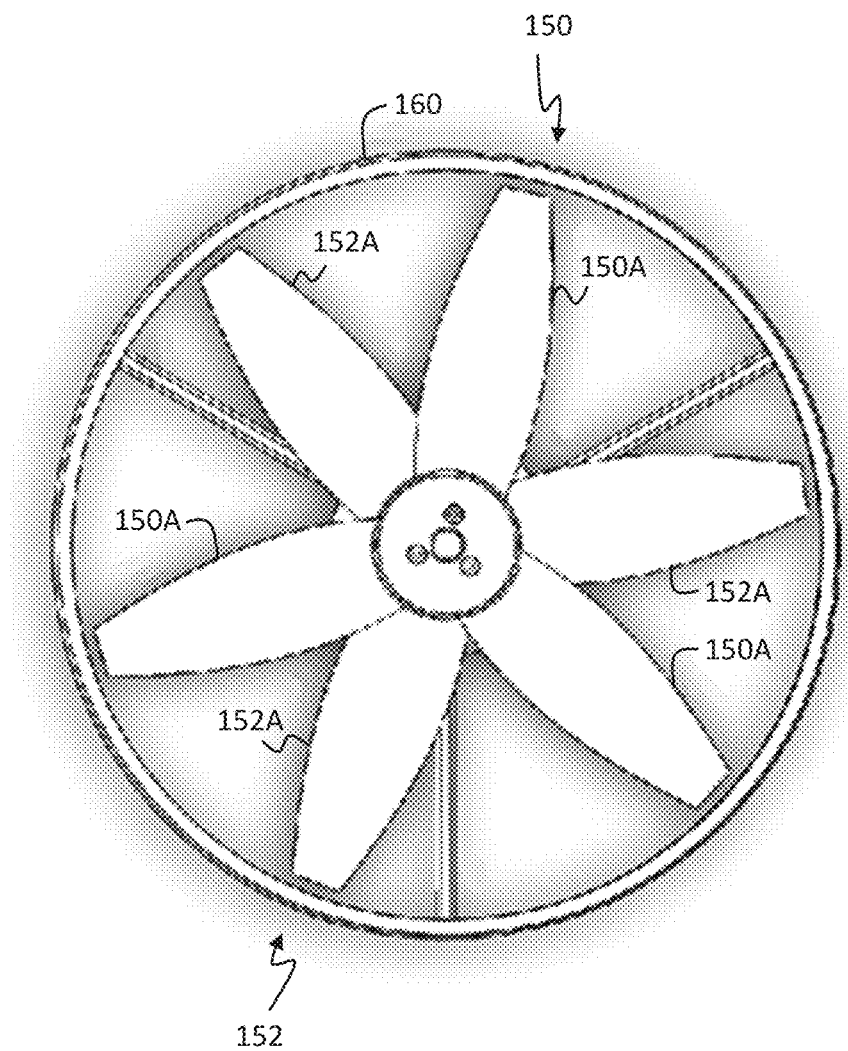

With reference to FIG. 16, in one embodiment, the mass 202 can be part of or the entire aerial system fuselage along with its electronic components below the pivot point 204. The aerial system 12' of FIG. 16 includes an upper body 20A and a lower body 20B rotatably coupled by joint at pivot point 204. The lower body 20B forms the mass 202. In this manner, the mass of the existing aerial system fuselage and the electronic components inside can be leveraged and no additional mass unit is needed. For the same amount of pivot angle change, a greater shift of center of mass of the aerial system can be achieved for more sensitive steering control and maneuverability. The caveat is that a greater torque of the motor may be required for shifting the mass.

With reference to FIGS. 17-22, another embodiment of the aerial system 12' is shown. The aerial system 12 includes a body 20', an upper propeller 150 and a lower propeller 152. The upper propeller 150 includes three propeller blades 150A and the lower propeller 152 includes three propeller blades 152A. The propellers 150, 152 are rotatably coupled to the body 20' at one end. A camera 154, a gimbal 156 and a position and height sensor 158 are located at an opposite end. As shown, the body 20' tapers towards the one end. A motor tilt mechanism or actuator 200' is also located at the one end.

Figure 20:
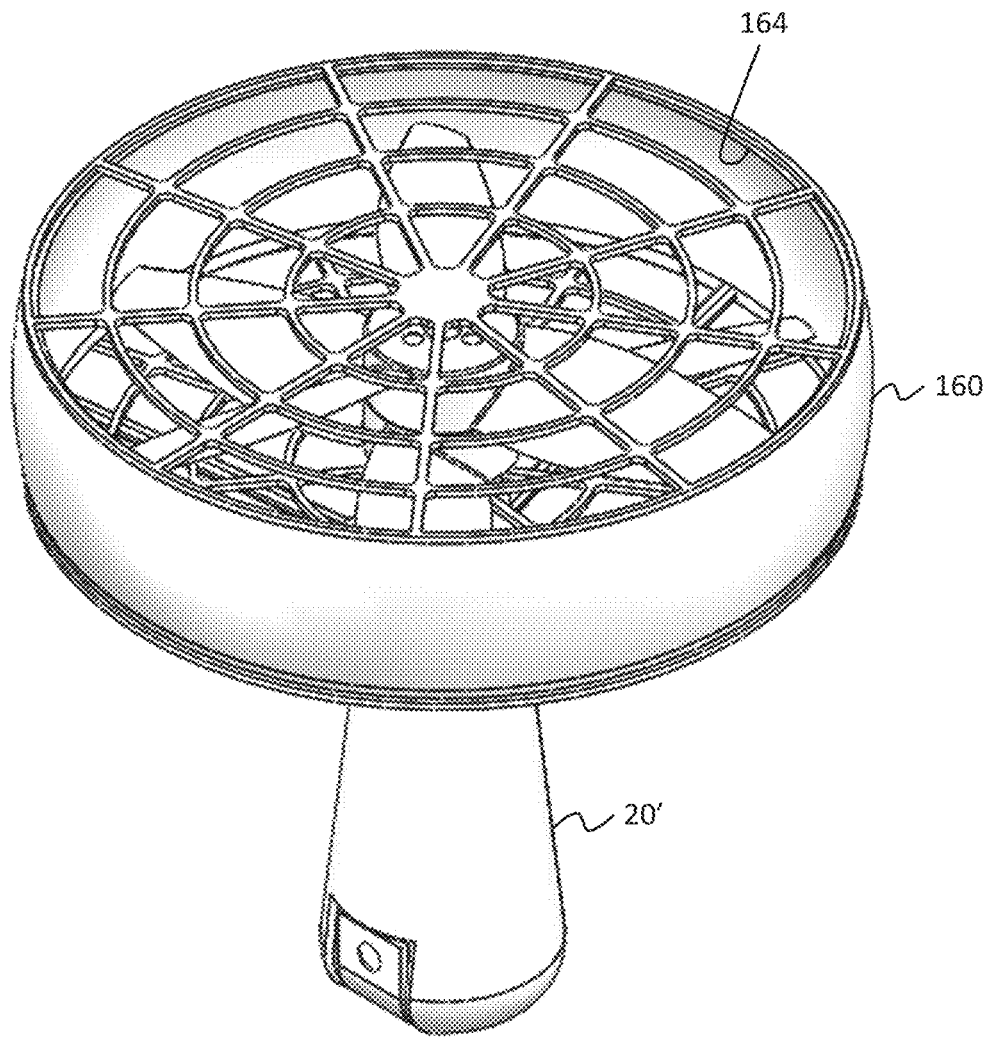
Figure 21:
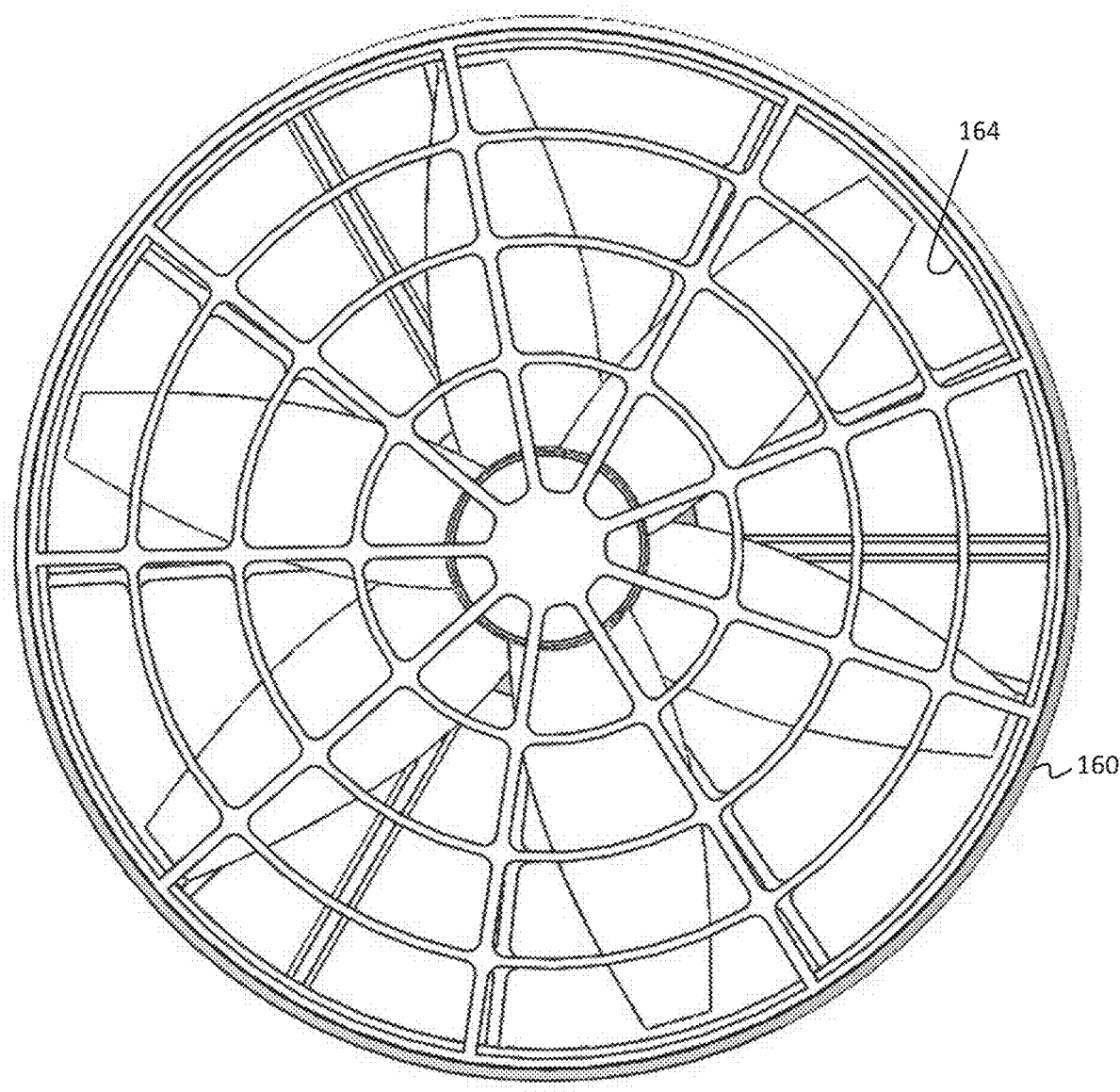
Figure 22:
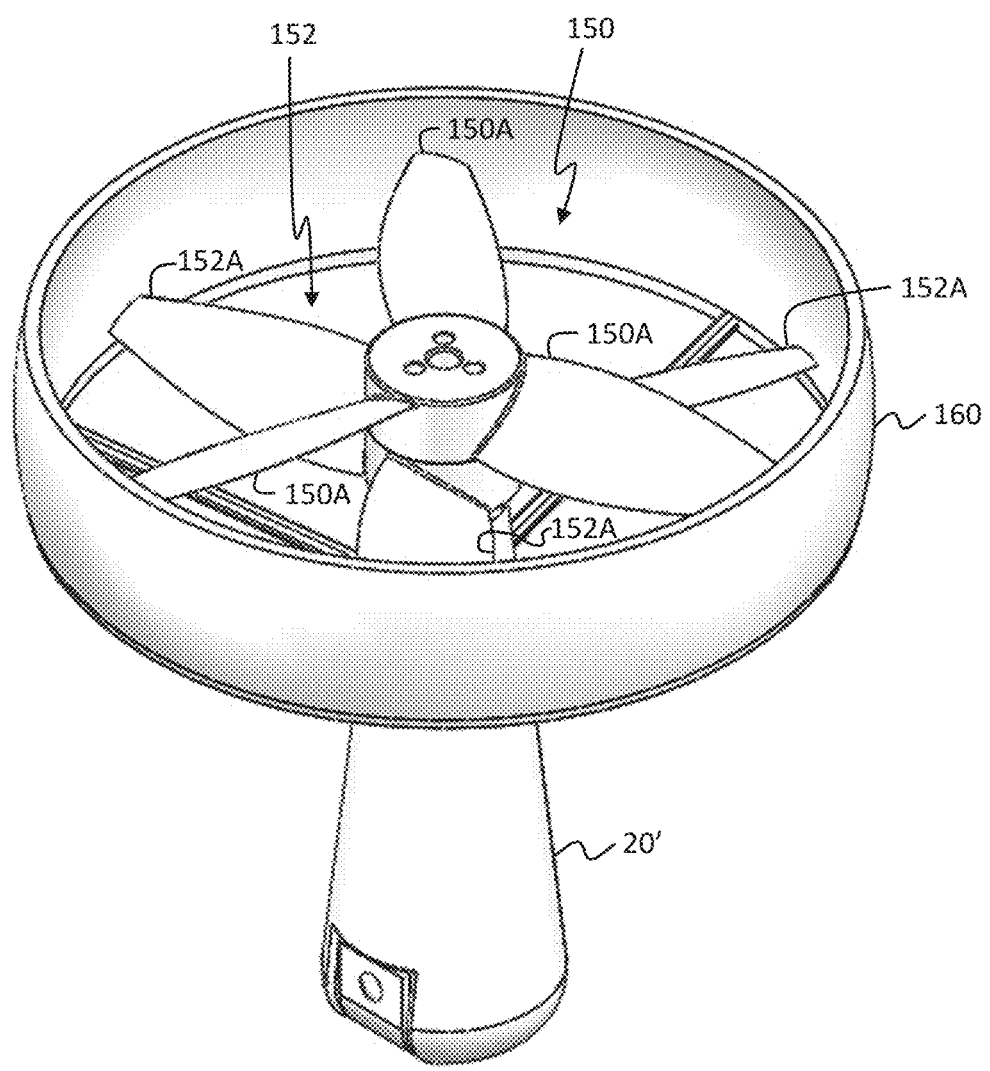

As shown, the aerial system 12' includes a protective frame 160 which surrounds the outer tips of the propeller blades 105A, 152A. The protective frame 160 is coupled to the body 20' by a bracket 162 which includes a plurality of struts as shown. As shown in FIGS. 20 and 21, the protective frame 160 includes a grid 164. The grid 164 may be fixed to the protective frame 160 or may rotate with the propellers 150, 152.

Another variant is to have multiple (typically two) motors to steer the mass along multiple axes to achieve all-direction steering control. It shares the same concept using a swashplate and two servo motors plus four-bar linkage mechanism in a conventional helicopter design. Essentially this type of mechanism allows the normal axis of one of the spinning propeller (or both counter rotating propellers) to move away from the vertical center axis of the aerial system fuselage, generating steering power for the aerial system.

Another variant is to use a smaller motor/fan mechanism at the lower part of the body to blow wind towards a horizontal direction, and also to generate a torque to steer the body of the aerial system horizontally.

Accordingly, the embodiments described provide a convenient and robust aerial system for recording images and videos of the user or of the user's environment in a substantially autonomous and self-stabilizing manner. After the aerial system is activated, the aerial system may hover in place without further interaction from the user. While hovering, the aerial system may continuously or periodically obtain images and videos of the user or the user's environment. Thus, the user may easily take pictures of objects of interest without being limited to holding a traditional camera at arm's length, for example.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An aerial system, comprising:
a body;
a propeller coupled to the body;
a motor coupled to the propeller, the motor configured to rotate the propeller in a first direction, wherein the motor is further configured to rotate another portion of the aerial system in an opposing second direction;
a processing system configured to control the motor tocause the aerial system to hover in a substantially fixed pose;
a camera configured to obtain images of an environment proximate the aerial system while the aerial system is hovering; and
a tilt mechanism being controllable by the processing system, the tilt mechanism being disposed inside the body,
wherein the tilt mechanism includes a mass, a motor and a shaft, the mass being coupled to the motor by the shaft and being coupled to the body at a pivot point,
wherein the processing system is configured to rotate the motor to position the mass at a desired location, and
wherein the mass is pivoted to change a center of gravity of the body to tilt the body together with the propeller coupled to the body at a desired angle relative to a center of gravity of the aerial system.

2. The aerial system, as set forth in claim 1, wherein the aerial system further comprises an activation interface coupled to the processing system, the processing system being configured to initiate operation of the aerial system in response to activation of the activation interface.

3. The aerial system, as set forth in claim 1, wherein the propeller includes a plurality of propeller blades, wherein the propeller blades are movable between a folded position and an extended position.

4. The aerial system, as set forth in claim 1, further comprising a stationery frame coupled to the body and positioned to surround an outer edge of the propeller.

5. The aerial system, as set forth in claim 1, wherein the other portion of the aerial system is the body.

6. The aerial system, as set forth in claim 5, wherein the activation interface includes a sensor for detecting a rotational force or speed imparted to the body by a user, wherein the activation interface is activated as a function of the detected rotational force or speed.

7. The aerial system, as set forth in claim 6, wherein the activation interface is activated if the detected rotational force or speed exceeds a threshold.

8. The aerial system, as set forth in claim 1, wherein the body is encased in a housing, the housing being cylindrical and extending in a direction away from the propeller, wherein the propeller is mounted at a first end of the housing, the housing tapers inwardly at the first end.

9. The aerial system, as set forth in claim 8, wherein the housing includes a second end, further comprising at least one camera mounted on the housing at the second end.

10. The aerial system, as set forth in claim 8, wherein the housing includes a second end, further comprising first and second cameras mounted on the housing at opposite sides of the second end.

11. The aerial system, as set forth in claim 1, further comprising a second propeller, wherein the other portion of the aerial system includes the second propeller.

12. The aerial system, as set forth in claim 11, wherein the second propeller is driven by the motor.

13. The aerial system, as set forth in claim 11, further comprising a second motor coupled to the second propeller, wherein the second propeller is driven by the second motor.

14. The aerial system, as set forth in claim 11, including a first stabilizer coupled to the first propeller and a second stabilizer coupled to the second propeller, wherein the first and second stabilizers rotate with the first and second propellers respectively, and act to reduce torque induced to the body by motion of the respective propeller.

15. The aerial system, as set forth in claim 11, wherein the propeller includes a first plurality of propeller blades and the second propeller includes a second plurality of propeller blades, wherein the first and second plurality of propeller blades are movable between a folded position and an extended position.

\* \* \* \* \*